(12) United States Patent
Minich et al.

(10) Patent No.: US 10,190,714 B2
(45) Date of Patent: Jan. 29, 2019

(54) EXTENDED RANGE TAPPING SLEEVE AND GASKET

(75) Inventors: Raymond C. Minich, Bradford, PA (US); Daryl M. Piontek, Great Valley, NY (US)

(73) Assignee: Total Piping Solutions, Inc., Olean, NY (US)

( * ) Notice: Subject to any disclaimer, the term of this patent is extended or adjusted under 35 U.S.C. 154(b) by 1976 days.

(21) Appl. No.: 13/325,990

(22) Filed: Dec. 14, 2011

(65) Prior Publication Data

US 2012/0192963 A1    Aug. 2, 2012

Related U.S. Application Data

(63) Continuation-in-part of application No. 13/016,542, filed on Jan. 28, 2011.

(51) Int. Cl.
*F16L 41/06* (2006.01)

(52) U.S. Cl.
CPC ........... *F16L 41/06* (2013.01); *Y10T 137/612* (2015.04)

(58) Field of Classification Search
CPC . F16L 41/06; F16L 41/08; F16L 41/12; F16L 47/30

(Continued)

(56) References Cited

U.S. PATENT DOCUMENTS 2,616,736 A * 11/1952 Smith ................... F16L 41/12
                                                 138/99
3,189,970 A *  6/1965 Barr ..................... F16L 55/172
                                                 138/99

(Continued)

FOREIGN PATENT DOCUMENTS

CN      2535645 Y     2/2003
CN     101216136 A    7/2008

(Continued)

OTHER PUBLICATIONS

The International Search Report (ISR) and Written Opinion of the International Searching Authority for International Application No. PCT/US2012/022069; Publication No. WO 2012/102968; dated Nov. 12, 2012.

(Continued)

*Primary Examiner* — Aaron M Dunwoody
*Assistant Examiner* — Fannie C Kee
(74) *Attorney, Agent, or Firm* — Harter Secrest & Emery LLP

(57) ABSTRACT

An improved tapping sleeve assembly (114) comprising a sleeve (115) configured to clamp a main fluid conduit (116) oriented about a longitudinal axis (x-x), the sleeve having a first member (134), a second member (140) separate from the first member, and a connection assembly (121) between the first member and the second member, the first member having a branch aperture (123) configured to communicate with a branch fluid conduit (129), the connection assembly configured and arranged to tighten the first and the second members to the main fluid conduit, a gasket (132) disposed between the first member and the main fluid conduit, the gasket comprising a flexible sheet (133) and a thickened aperture seal (122) configured to extend around the branch aperture between the sleeve and the main fluid conduit, the gasket comprising an inwardly protruding circumferential seal bead (137*a*) extending substantially transverse to the longitudinal axis and intersecting an inwardly protruding portion of the aperture seal, the circumferential seal bead having a main length portion (139), the inwardly protruding portion of the aperture seal having a radial thickness (152) and the main length portion (139) of the circumferential seal bead having a radial thickness (141) less than the radial thickness of the inwardly protruding portion of the aperture seal, the circumferential seal bead having a junction end (Continued)

portion (153) between the main length portion of the circumferential seal bead and the inwardly protruding portion of the aperture seal, and the junction end portion of the circumferential seal bead having a non-uniform radial thickness (163).

20 Claims, 26 Drawing Sheets

(58) Field of Classification Search
USPC ............ 285/197–199, 133.21; 277/607, 626
See application file for complete search history.

(56) References Cited

U.S. PATENT DOCUMENTS

| | | | |
|---|---|---|---|
| 3,599,995 A | 8/1971 | Rafalski et al. | |
| 3,792,879 A * | 2/1974 | Dunmire | F16L 41/002 137/318 |
| 4,606,377 A | 8/1986 | Montgomery | |
| 4,708,373 A | 11/1987 | Morriss | |
| 4,889,167 A | 12/1989 | Morris | |
| 5,040,828 A | 8/1991 | Kane | |
| 5,358,286 A | 10/1994 | Eaton et al. | |
| 5,362,107 A | 11/1994 | Bridges | |
| 5,374,087 A | 12/1994 | Powers | |
| 5,590,913 A | 1/1997 | Morris et al. | |
| 6,173,967 B1 | 1/2001 | Eskew et al. | |
| 6,412,824 B2 * | 7/2002 | Kunsnnan | F16L 41/12 277/626 |
| 6,588,767 B2 | 7/2003 | Kane | |
| 6,830,268 B2 | 12/2004 | Krausz et al. | |
| 7,070,209 B2 | 7/2006 | Collins | |
| 7,232,160 B2 | 6/2007 | Krausz et al. | |

FOREIGN PATENT DOCUMENTS

| | | |
|---|---|---|
| GB | 2119893 B1 | 11/1983 |
| JP | 2001050461 A | 2/2001 |

OTHER PUBLICATIONS

The International Preliminary Report on Patentability Chapter I for Application Serial No. PCT/US2012/022069; Publication No. WO 2012/102968; dated Jul. 30, 2013.

* cited by examiner

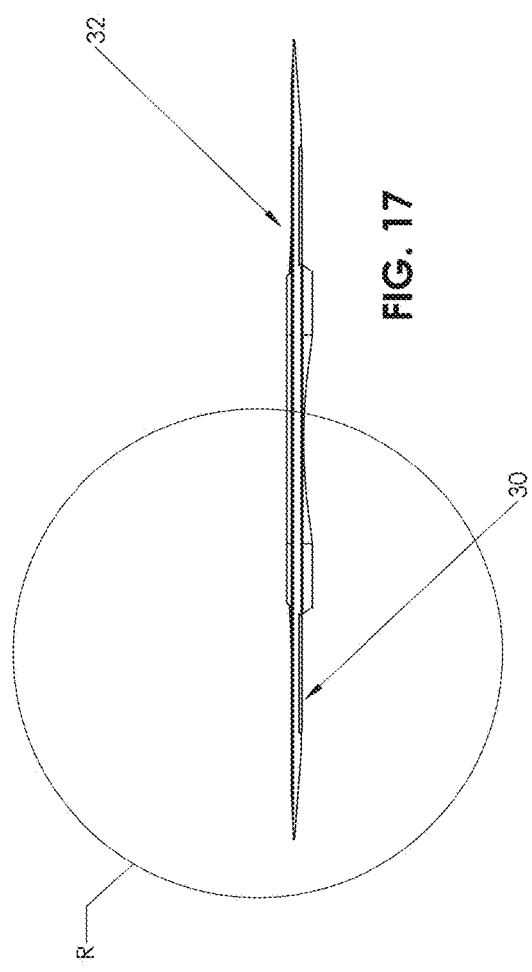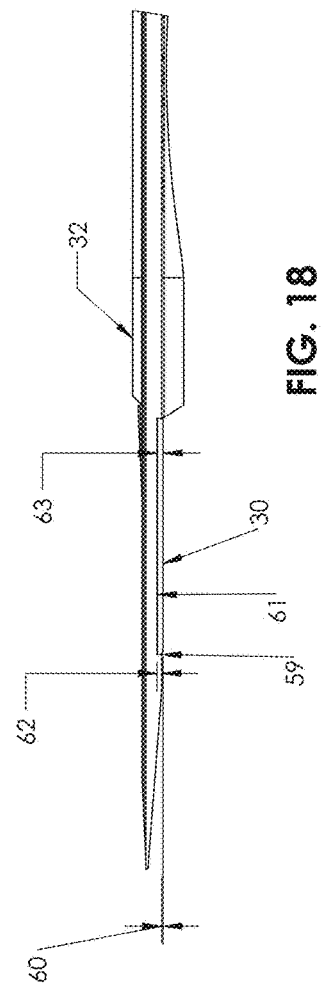

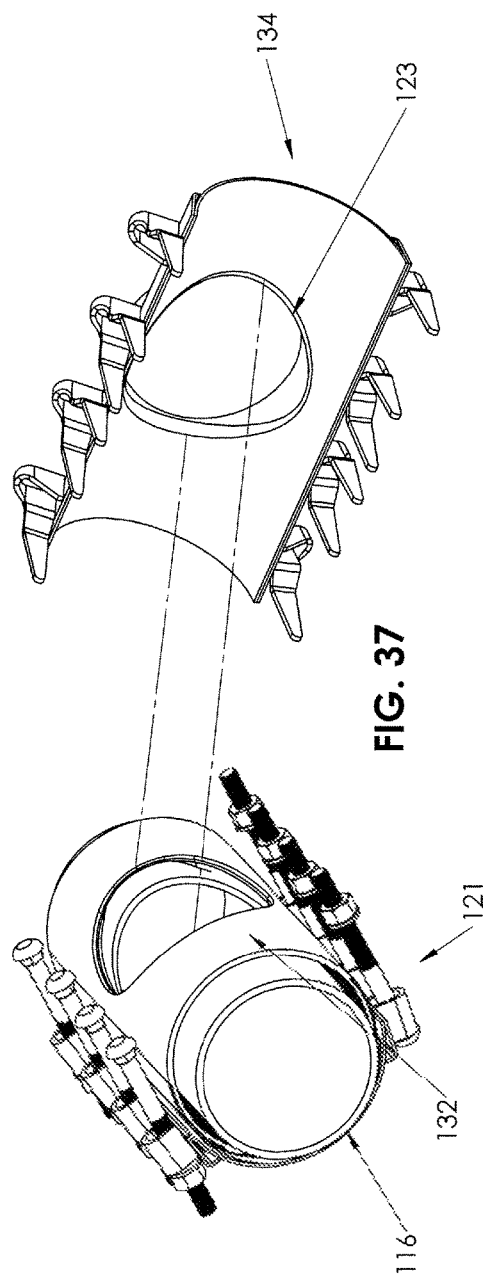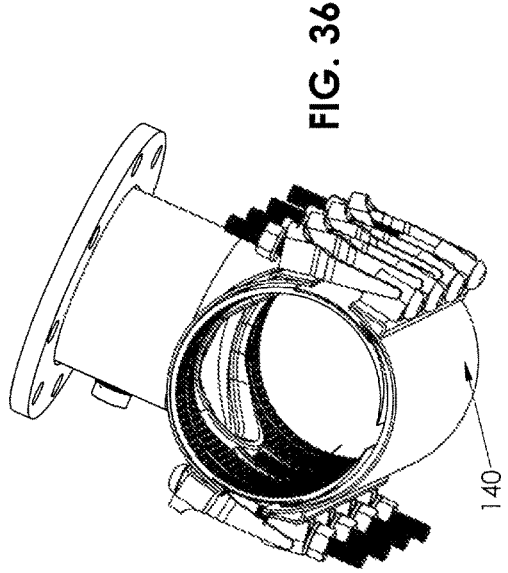
FIG. 37
FIG. 36

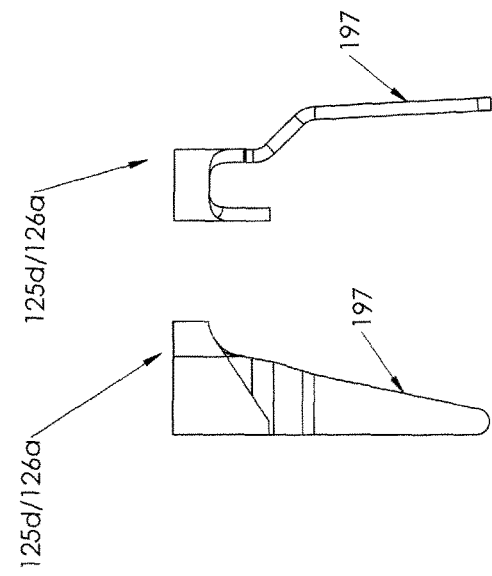
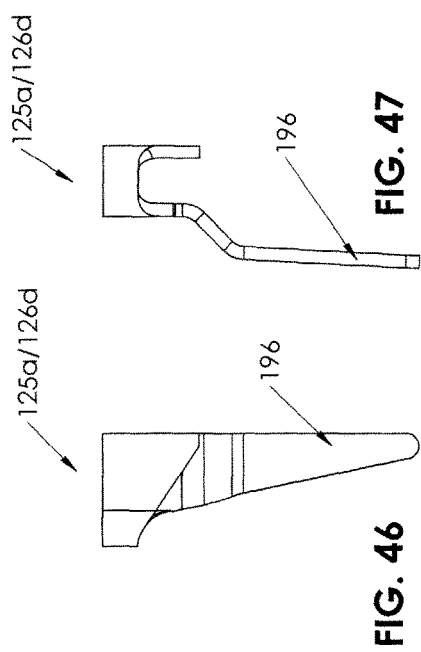
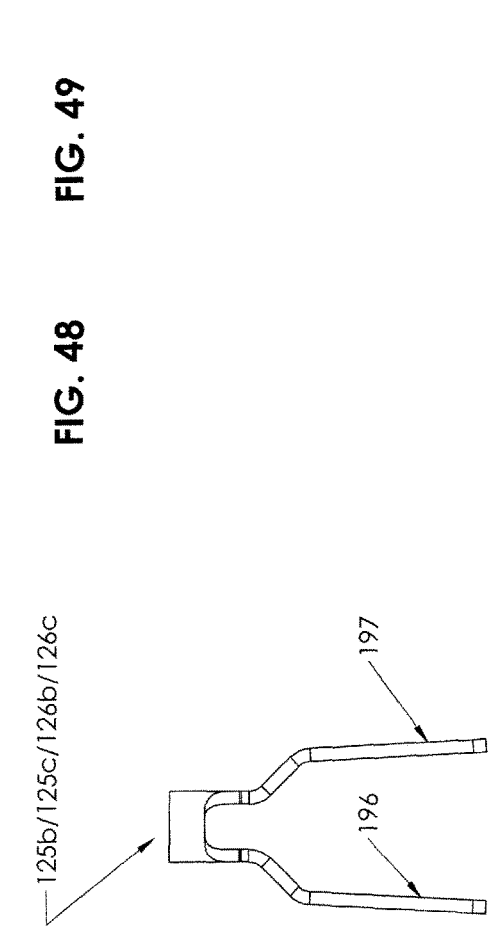
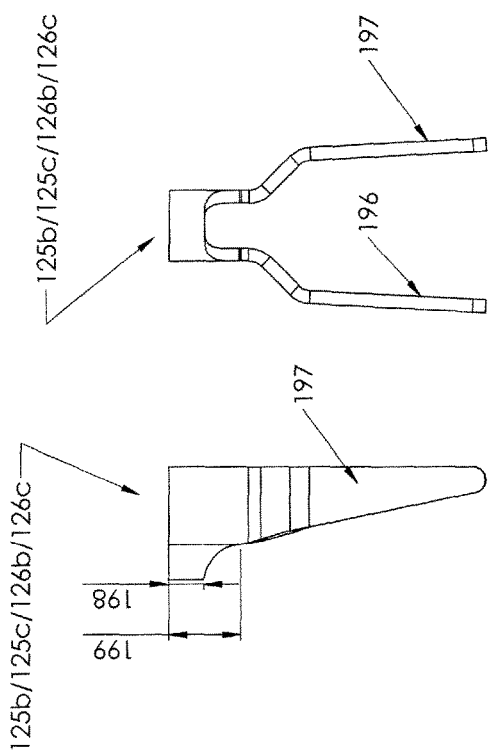

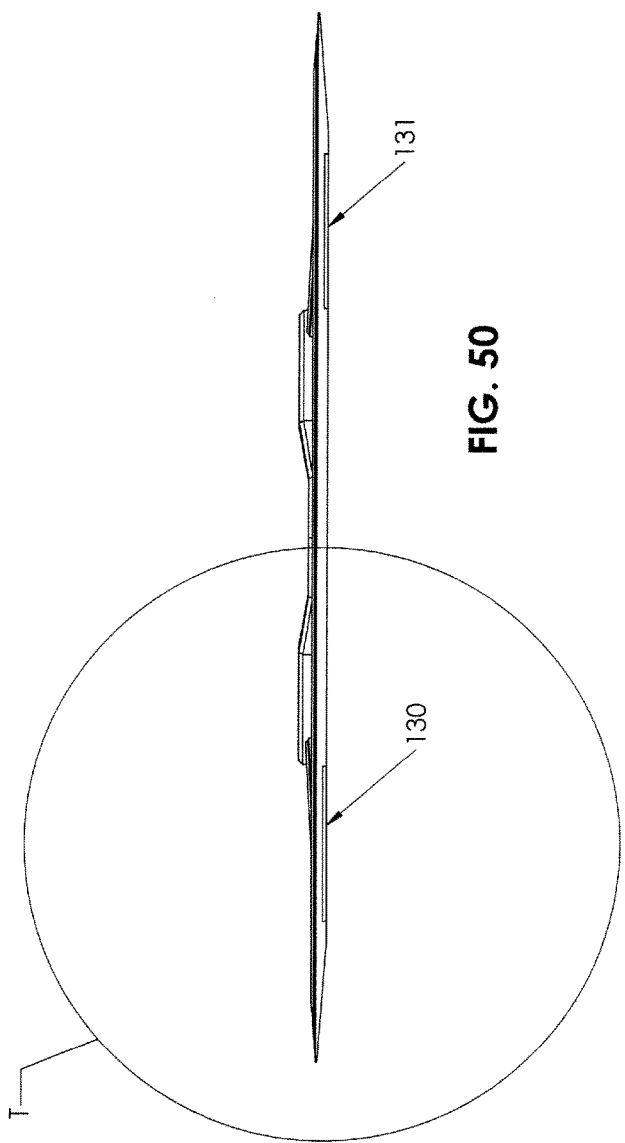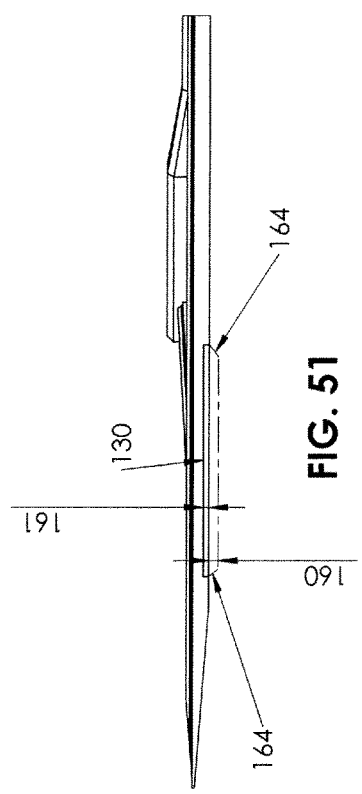

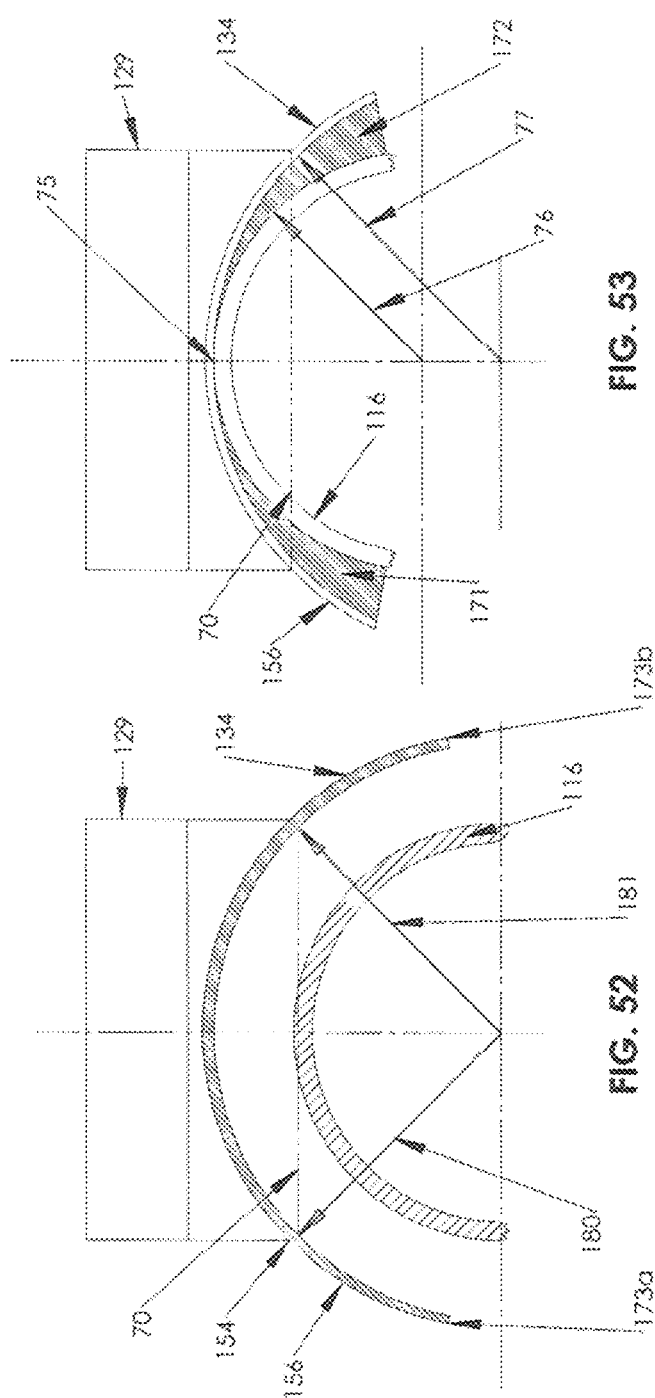

EXTENDED RANGE TAPPING SLEEVE AND GASKET

CROSS-REFERENCE TO RELATED APPLICATIONS

This application is a continuation-in-part of U.S. patent application Ser. No. 13/016,542, filed Jan. 28, 2011. The entire content of such application is incorporated by reference herein.

TECHNICAL FIELD

The present invention relates generally to the field of pipe fittings, and more particularly to an improved tapping sleeve and gasket.

BACKGROUND ART

Tapping sleeves are used to enable or permit branch connections to be made to fluid carrying (i.e. water main for distribution) pipes and pipelines. Current tapping sleeve designs typically employ branch sealing (aperture) gasket bead geometries of constant height cross sections, and locate the aperture seal immediately adjacent to the branch transition. However, existing tapping sleeve and gasket assemblies have a limited range of the minimum to maximum pipe diameter on which a given sleeve effectively seals to the fluid carrying pipe.

BRIEF SUMMARY OF THE INVENTION

With parenthetical reference to corresponding parts, portions or surfaces of the disclosed embodiment, merely for the purposes of illustration and not by way of limitation, the present invention provides an improved tapping sleeve assembly (114) comprising a sleeve (115) configured to clamp a main fluid conduit (116) oriented about a longitudinal axis (x-x), the sleeve having a first member (134), a second member (140) separate from the first member, and a connecting assembly (121) between the first member and the second member, the first member having a branch aperture (123) configured to communicate with a branch fluid conduit (129), the connection assembly configured and arranged to tighten the first and the second members to the main fluid conduit, a gasket (132) disposed between the first member and the main fluid conduit, the gasket comprising a flexible sheet (133) and a thickened aperture seal (122) configured to extend around the branch aperture between the sleeve and the main fluid conduit, the gasket comprising an inwardly protruding circumferential seal bead (137a) extending substantially transverse to the longitudinal axis and intersecting an inwardly protruding portion of the aperture seal, the circumferential seal bead having a main length portion (139), the inwardly protruding portion of the aperture seal having a radial thickness (152) and the main length portion (139) of the circumferential seal bead having a radial thickness (141) less than the radial thickness of the inwardly protruding portion of the aperture seal, the circumferential seal bead having a junction end portion (153) between the main length portion of the circumferential seal bead and the inwardly protruding portion of the aperture seal, and the junction end portion of the circumferential seal bead having a non-uniform radial thickness (163).

The junction end portion of the circumferential seal bead may increase in radial thickness between the main length portion of the circumferential seal bead and the inwardly protruding portion of the aperture seal. The increase in radial thickness of the junction end portion may be non-linear. The inwardly protruding portion of the aperture seal may be arcuate and the aperture seal may have a non-uniform radial thickness. The junction end portion of the circumferential seal bead may have a thickness greater than the thickness of the main length portion and the junction end portion may be tapered from substantially the thickness of the main length portion to substantially the thickness of the inwardly protruding portion of the aperture seal. The circumferential seal bead may have a dual bead configuration. The gasket may further comprise a second inwardly protruding circumferential seal bead (137b) extending substantially transverse to the longitudinal axis and intersecting a second inwardly protruding portion of the aperture seal. The inwardly protruding circumferential seal bead and the second inwardly protruding circumferential seal bead may be substantially parallel. The inwardly protruding portion of the aperture seal and the second inwardly protruding portion of the aperture seal may be connected and may be of substantially the same radial thickness. The inwardly protruding circumferential seal bead and the second inwardly protruding circumferential seal bead may be separated by a varying distance. The main length portion of the circumferential seal bead may have a non-uniform radial thickness. The main length portion may comprise a feathered end portion (144). The main length portion of the circumferential seal bead may comprise a cross-sectional profile and the cross-sectional profile may comprise a first lower ledge (184), a first bead (186), a second lower ledge (190) and a second bead (188).

In another aspect, the invention provides a tapping sleeve assembly comprising a sleeve (115) configured to clamp on to a main fluid conduit (116) oriented about a longitudinal axis (x-x), the sleeve having a first member (134), a second member (140) separate from the first member, and a connecting assembly (121) between the first member and the second member, a branch aperture (123) in the first member communicating with a branch fluid conduit (129) attached to the first member, the connection assembly configured and arranged to tighten the first and the second members to the main fluid conduit from a non-actuated position to a tightened position, a gasket (132) disposed between the first member and the main fluid conduit, the gasket comprising a flexible sheet (133) having an inwardly facing surface (145) and an outwardly facing surface (146) and a thickened aperture seal (122) configured to extend around the branch aperture between the sleeve and the main fluid conduit, and the aperture seal having a non-uniform radial thickness (150-152) around the branch aperture when the connection assembly is in the non-actuated position.

The aperture seal may comprise a first inwardly protruding portion (149), a second inwardly protruding portion (148) and a third inwardly protruding portion (147). The radial thickness (150) of the third portion may be reduced from the radial thickness (152) of the first portion. The second portion may have a radial thickness (151) that changes in proportion to transverse distance from the longitudinal axis. The change in thickness may be non-linear. The second portion may extend between the first portion and the second portion. The first portion may have a uniform radial thickness and the second portion may have a uniform radial thickness. The aperture seal may be elliptical in shape. The first, second and third portions may be arcuate portions of the elliptical aperture seal. The aperture seal may comprise a portion having a cross-sectional thickness that changes substantially in proportion to transverse distance from the longitudinal axis. The aperture seal may be elliptical in shape and may have a minor axis (x-x) substantially parallel to the longitudinal axis. The thickened aperture seal may extend inwardly beyond the inwardly facing surface of the flexible sheet of the gasket and may not extend outwardly beyond the outwardly facing surface of the flexible sheet of the gasket. The aperture seal may have a first portion having a first thickness and a second portion having a second thickness, wherein the first portion is compressed between the first member and the main fluid conduit before the second member is compressed between the first member and the main fluid conduit when the connection assembly is tightened from the non-actuated position to the tightened position. The aperture seal may be offset a distance (157) from the branch aperture and the offset distance may be non-uniform. The branch fluid conduit attachment to the first member may substantially stiffen the first member in a region (155) proximate the branch aperture and the offset may be outward of the substantially stiffened region. The aperture seal may be molded separately from the flexible sheet. The inwardly facing surface of the flexible sheet may comprise multiple spaced-apart cavities (183).

In another aspect, the invention provides a tapping sleeve assembly comprising a sleeve (115) configured to clamp on to a main fluid conduit (116) oriented about a longitudinal axis (x-x), the sleeve having a first member (134) and a second member (140) separate from the first member, a gasket (132) disposed between the first member and the main fluid conduit, a branch aperture (123) in the first member configured to communicate with a branch fluid conduit (129) attached to the first member, a connecting assembly (121) configured and arranged to tighten the first and the second members to the main fluid conduit from a non-actuated position to a tightened position, the connection assembly comprising a first side bar element (124b) connected proximate to a longitudinally extending edge (173b) of the first member and a second side bar element (119b) connected proximate to a longitudinally extending edge (174b) of the second member, the first side bar element comprising a first longitudinally extending mounting plate (166b) connected to the first member between the longitudinally extending edge of the first member and the branch aperture, the second side bar element comprising a second longitudinally extending mounting plate (167b) connected to the second member, multiple bolt receiving lugs (125a-d) extending from the first mounting plate and multiple bolt receiving lugs (127a-d) extending from the second mounting plate at corresponding positions along the longitudinal axis and a bolt (118a-d) extending between each of the respective lugs on the first mounting plate and the second mounting plate, the first mounting plate connected to the first member so as to provide a flexible region (156b) of the first member between the branch aperture and the first side bar element in a configuration in which the branch aperture and the main fluid conduit have a substantially similar diameter, and whereby the first side bar element and the second side bar element may be drawn towards each other such that the first member bends in the flexible region around the main fluid conduit with tightening of the first and second members to the main fluid conduit.

The gasket may comprise a flexible sheet (133) having an inwardly facing surface (145) and an outwardly facing surface (146) and a thickened aperture seal (122) configured to extend around the branch aperture between the sleeve and the main fluid conduit. The first and the second side bar elements may be L-shaped members having a long leg portion (166b, 167b) and a short leg portion (165b, 168b). The short leg portion (168b) of the second side bar element (119) may be longer than the short leg portion (165b) of the first side bar element (124). The branch fluid conduit may be configured to attach to the first member with a butt weld (154). The lugs may be loaded in shear when the first and the second members are tightened to the main fluid conduit.

In another aspect the invention provides a tapping sleeve assembly comprising a sleeve (115) configured to clamp on to a main fluid conduit (116) oriented about a longitudinal axis (x-x), the sleeve having a first member (134) and a second member separate (140) from the first member, a connecting assembly (121) configured and arranged to tighten the first and the second members to the main fluid conduit from a non-actuated position to a tightened position, the connection assembly comprising a first side bar (124b) connected proximate to a longitudinally extending edge (173b) of the first member and a second side bar (119b) connected proximate to a longitudinally extending edge (174b) of the second member, the first side bar comprising a first longitudinally extending mounting plate (166b) connected to the first member, the second side bar comprising a second longitudinally extending mounting plate (167b) connected to the second member, multiple bolt receiving lugs (125a-d) extending from the first mounting plate and multiple bolt receiving lugs (127a-d) extending from the second mounting plate at corresponding positions along the longitudinal axis (x-x), each of the lugs comprising an opening (192a-d, 194a-d) for receiving a bolt, a bolt (118a-d) extending between each of the respective lugs on the first mounting plate and the second mounting plate at each of the longitudinal positions, and each of the openings (192a-d) in the lugs extending from the first mounting plate configured and arranged to permit the bolt (118a-d) to pivot in the lug opening relative to the first mounting plate, whereby the first member may engage the main fluid conduit and the second member may be moved from a first position substantially disengaged from the main fluid conduit to a second position engaging the main fluid conduit.

The openings (192a-d) in the lugs extending from the first mounting plate may be U-shaped. The lug openings may have a non-uniform depth. The depth of a portion of the lug opening may decrease substantially in proportion to distance from the mounting plate. The lug may comprise a moment reaction wing (196, 197). The lug and the moment reaction wing may comprise a unitary formed member. The lugs may be loaded in shear when the first and the second members are tightened to the main fluid conduit. At least one of the lugs and at least a portion of the first side bar may comprise a unitarily formed member.

In another aspect, the invention provides a tapping sleeve assembly comprising, a sleeve (115) configured to clamp a main fluid conduit (116) oriented about a longitudinal axis (x-x), the sleeve having a first member (134), a second member (140) separate from the first member, and a connecting assembly (121) between the first member and the second member, the connection assembly configured and arranged to tighten the first and the second members to the main fluid conduit, a gasket (132) disposed between the first member and the main fluid conduit, the gasket comprising a flexible sheet (133) having a master contact surface (145) and a seal bead (137) having a cross-sectional profile protruding from the master contact surface, the cross-sectional profile comprising a first lower ledge 184), a first bead (186), a second lower ledge (190) and a second bead (186), the first lower ledge between the master surface and the first bead and raised relative to the master contact surface, the first bead raised relative to the first lower ledge, the second bead between the first bead and the second lower ledge, the second bead raised relative to the second lower ledge and the first lower ledge, and the second lower ledge between the master contact surface and the second bead and raised relative to the master contact surface.

The cross-sectional profile may further comprise a first upper ledge (185) between the first lower ledge and the first bead, a second upper ledge (189) between the second lower ledge and the second bead, the first upper ledge raised relative to the first lower ledge, the second upper ledge raised relative to the second lower ledge, the first bead raised relative to the first upper ledge, and the second bead raised relative to the second upper ledge. The cross-sectional profile may further comprise a land (187) between first bead and the second bead. The flexible sheet may comprise a waffle cavity (183) between the master surface and the first lower ledge. The tapping sleeve may further comprise a second gasket (142) disposed between the first member and the main fluid conduit, the second gasket comprising a flexible sheet having a master contact surface and a seal bead having a cross-sectional profile substantially similar to the cross-sectional profile of said first gasket, the seal bead of the first gasket and the seal bead of the second gasket aligned relative to the main fluid conduit so as to provide a 360 degree seal bead around the main fluid conduit.

Accordingly, the general object is to provide a tapping sleeve that provides for sufficient gasket sealing force and seal pressure to seal the tapping sleeve body to the main fluid carrying pipe with varying pipe outside diameters and pipe materials within a nominal pipe diameter range.

Another object is to provide a tapping sleeve that may be used on extended ranges of pipe outside diameters.

Another object is to provide a tapping sleeve that reduces the number of different sleeves that must be held in inventory to cover the range of pipe diameters encountered in a given nominal pipe diameter range.

Another object is to provide a tapping sleeve that at least doubles the range of pipe diameters on which a given tapping sleeve nominal size may be employed, compared to the current products available in the marketplace.

Another object is to provide a tapping sleeve having improved performance and operational efficiency.

These and other objects and advantages will become apparent from the foregoing and ongoing written specification, the drawings, and the claims.

BRIEF DESCRIPTION OF THE DRAWINGS

FIG. 17 is an unrolled side view of the upper gasket and spanner shown in FIG. 3.

FIG. 18 is an enlarged detailed view of the upper gasket and spanner shown in FIG. 17, taken within the indicated circle R of FIG. 17.

FIG. 36 is a left internal isometric view of the tapping sleeve shown in FIG. 21.

FIG. 37 is a partial exploded isometric view of the tapping sleeve shown in FIG. 21 without the branch line shown.

FIG. 44 is a side view of a dual tined moment reaction wing lug shown in FIG. 21.

FIG. 45 is a left side view of the dual tined moment reaction wing lug shown in FIG. 44.

FIG. 46 is a side view of a left tined moment reaction wing lug shown in FIG. 21.

FIG. 47 is a left side view of the left tined moment reaction wing lug shown in FIG. 46.

FIG. 48 is a side view of a right tined moment reaction wing lug shown in FIG. 21.

FIG. 49 is a left side view of the right tined moment reaction wing lug shown in FIG. 48.

FIG. 50 is an unrolled side view of the upper gasket and spanner shown in FIG. 23.

FIG. 51 is an enlarged detailed view of the upper gasket and spanner shown in FIG. 50, taken within the indicated circle T of FIG. 50.

FIG. 52 is a partial schematic view of the upper shell, branch pipe and main pipe shown in FIG. 23 in a non-actuated condition.

FIG. 53 is a partial schematic view of the minimum additional space tilled by the upper gasket shown in FIG. 23.

DETAILED DESCRIPTION OF THE PREFERRED EMBODIMENTS

Figure 1:
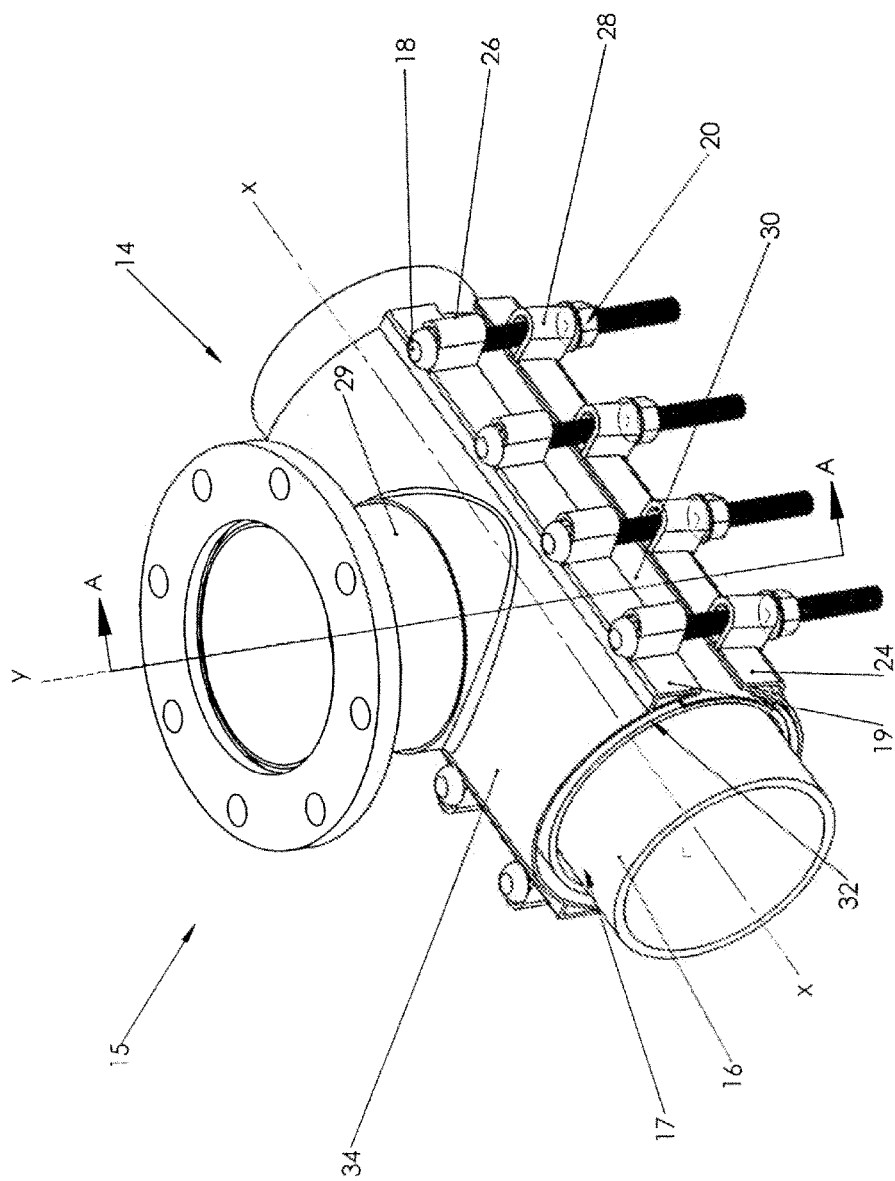
FIG. 1 is a top isometric view of an embodiment of the improved tapping sleeve and gasket assembly in engagement with a pipe.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 2:
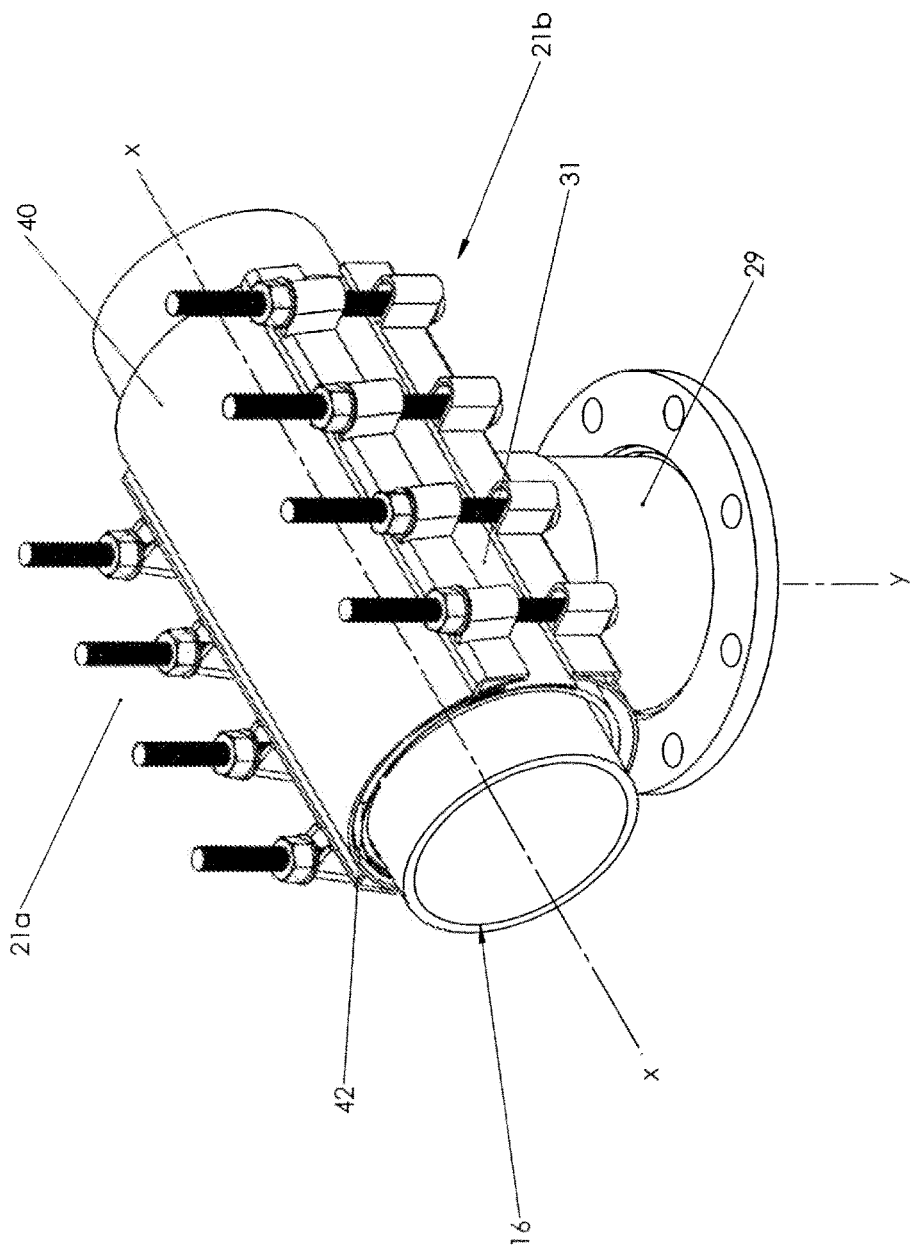
FIG. 2. is a bottom isometric view of the tapping sleeve assembly shown in FIG. 1.
Figure 3:
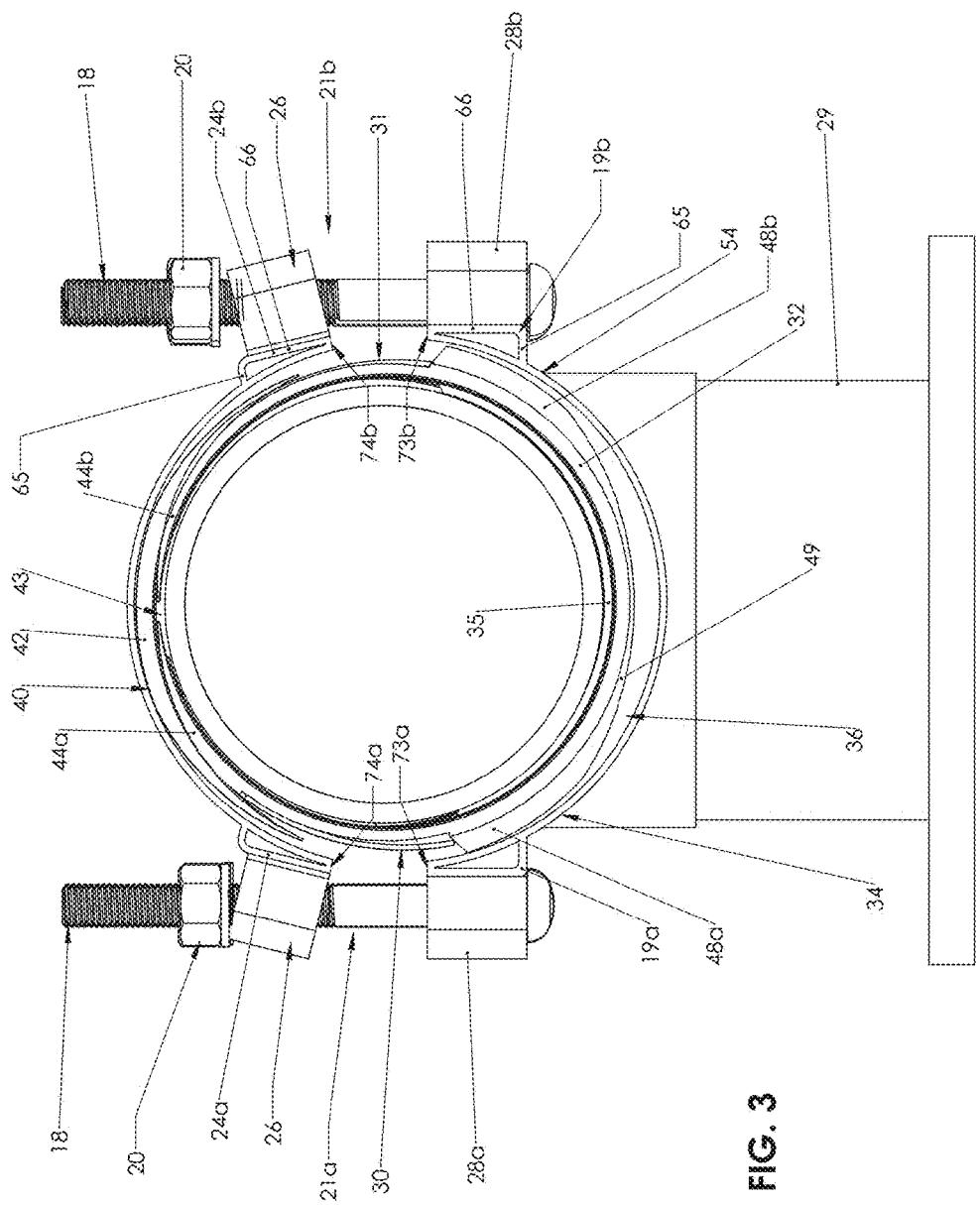
FIG. 3 is a left side view of the tapping sleeve assembly shown in FIG. 2.
Figure 5:
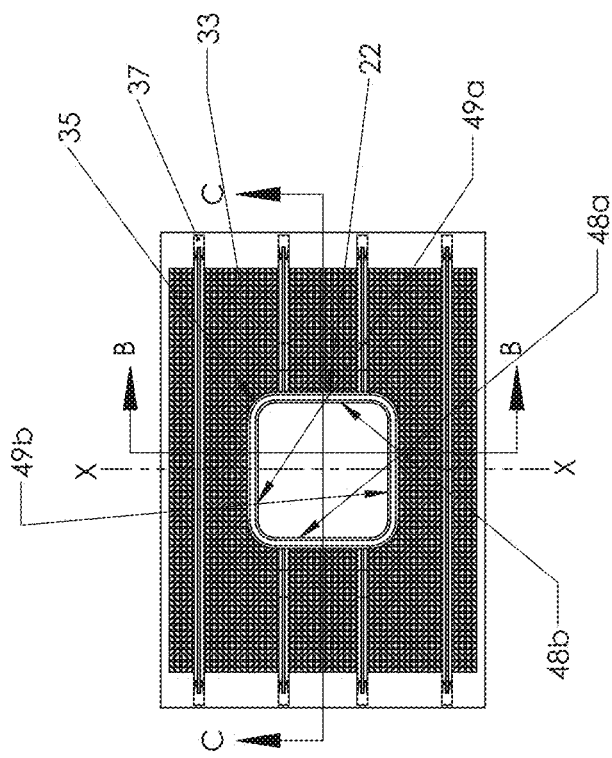
FIG. 5 is a top plan view of the upper gasket shown in FIG. 1 unrolled.
Figure 4:
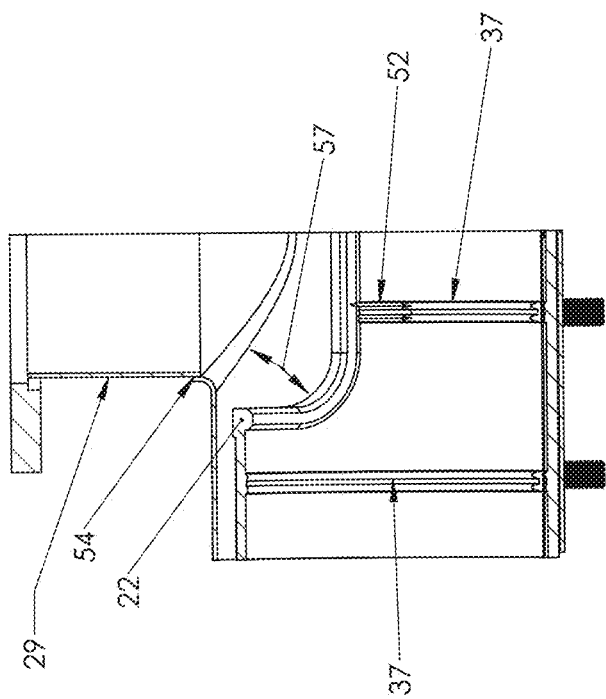
FIG. 4 is a transverse vertical cross-sectional view of the tapping sleeve assembly shown in FIG. 1, taken generally on line A-A of FIG. 1.

Referring now to the drawings, and more particularly to FIG. 1 thereof, this invention provides an improved tapping sleeve and gasket assembly, of which a first embodiment is generally indicated at 14. As shown in FIGS. 1-3, assembly 14 generally comprises tapping sleeve 15, which in operation is mounted on the outside of pipe 16, and gasket 17, which in operation is disposed between pipe 16 and sleeve 15.

Tapping sleeve 15 includes semi-cylindrical top half shell 34, semi-cylindrical lower half shell 40, and specially configured spanners 30 and 31. Top half shell 34 and bottom half shell 40 are connected and tightened around pipe 16 with connection assembly 21a and 21b.

Gasket 17 includes upper gasket 32 and lower spanning gasket 42. As described in further detail below, upper gasket 32 and lower gasket 42 are flexible elastomeric matte gasket sheets having specially contoured raised or thickened sealing beads, including circumferential seal beads 37 and thickened branch aperture seal 22 on upper gasket 32.

Tapping sleeve assembly 14 is formed by joining and welding in place a cylindrical branch connection 29 to top half shell 34, which is then mated to fluid carrying pipe 16 with upper gasket 32, lower half shell 40 and lower gasket 42. Gaskets 32 and 42 are sandwiched between the inside cylindrical surfaces of shells 34 and 40 and the outside cylindrical surface of main fluid carrying pipe 16 to provide sufficient sealing force to prevent leakage of fluid from the interface once a tap is made into fluid carrying pipe 16 through branch outlet 29. Elastic (sealing) energy is imparted into the structure by tightening or actuating connections 21a and 21b from a loosened or non-actuated position, shown in FIG. 3, to a tightened sealed position.

As shown in FIGS. 1-3, L-shaped sidebars 19a and 19b are welded to the two edges 73a and 73b of top shell 34 that are coincident with the longitudinal axis x-x of pipe 16 and L-shaped sidebars 24a and 24b are welded to the two edges 74a and 74b of lower shell 40 that are coincident with the longitudinal axis x-x of pipe 16. As shown, each side bar is formed of a first generally horizontally extending member 65 and a second generally vertically extending member 66 joined at one longitudinal edge to the longitudinal edge of the respective shell and connected at the other longitudinal edge to the outer longitudinal edge of horizontal member 65, with horizontal member 65 not being as wide as vertical member 66. Thus, side bars 19 and 24 are configured such that they do not extend horizontally from axis x-x substantially beyond the longitudinal edges 73 and 74 of top shell 34 and lower shell 40, respectively, when shells 34 and 40 are in an un-tightened or non-actuated position. Instead, a series of lugs, severally indicated at 26 and 28, are in turn welded to sidebars 19 and 24, respectively, to provide the necessary clearance outside of shells 34 and 40 for bolts 18. Threaded bolts 18 extend between lugs 26 and 28 and corresponding nuts 20 are tightened on bolts 18 to draw sidebars 19 of top shell 34 and opposed sidebars 24 of lower shell 40 together, thereby tightening sleeve 15 to pipe 16. Alternatively, connection assemblies 21 may be formed as complete castings. Connections 21a and 21b result in less stiffening of the longitudinal ends of shells 34 and 40 and thereby allow sleeve 15 to flex and actuate gasket 32 to form a tight seal when connections 21a and 21b are tightened.

As shown in FIGS. 3 and 5-11, upper gasket 32 is sized to encircle substantially completely the outside diameter of the smallest diameter fluid carrying pipe 16 for the given sleeve size. Lower matte gasket 42 is sized to span the zone of reduced gasket thickness and any gap 43 between the longitudinal tapered proximal edge portions 44a and 44b of lower gasket 32. Thus, as the pipe diameter on which assembly 14 is installed increases, upper matte gasket 32 ends 44a and 44b separate, and lower matte gasket 42 further engages upper gasket 32 to continue the sealing action.

As explained in further detail below with respect to upper gasket 32, lower gasket 42 includes inwardly extending raised seal beads running circumferentially and transversely to the longitudinal axis x-x of pipe 16. The inner seal beads face the outer surface of fluid carrying pipe 16 to provide for increased localized gasket sealing pressure.

As shown in FIGS. 3-20, upper gasket 32 is formed of a flexible sheet 33 with a specially contoured thickened aperture seal 22 and multiple transversely extending protruding or raised inner circumferential seal beads 37. Aperture seal 22 has a specially contoured profile and shape that includes protruding or raised inner aperture seal bead 35 and protruding or raised outer aperture seal bead 36. While shown as being integrally molded as part of gasket 32, main aperture seal 22 could be molded separately from the remainder of gasket 32, thereby allowing for different main seal profiles to be used interchangeably, which provide manufacturing costs reductions and improved inventory efficiency.

As shown, sheet 33 of upper gasket 32 includes inwardly extending raised seal beads 37 that running circumferentially and transversely to longitudinal axis x-x of fluid carrying pipe 16. Inner seal beads 37 face the outer surface of fluid carrying pipe 16 to provide for increased localized gasket sealing pressure. These circumferential seal beads provide for improved seal performance if main fluid carrying pipe 16 should suffer a complete circumferential break, as is possible when tapping sleeve 14 is used to branch into brittle conductor pipe materials such as ductile iron, asbestos cement or concrete pipe materials. These circumferential raised seal beads provide matte gasket stiffening support, and prevent the matte gasket from undergoing extrusion at the shell free ends.

Figure 10:
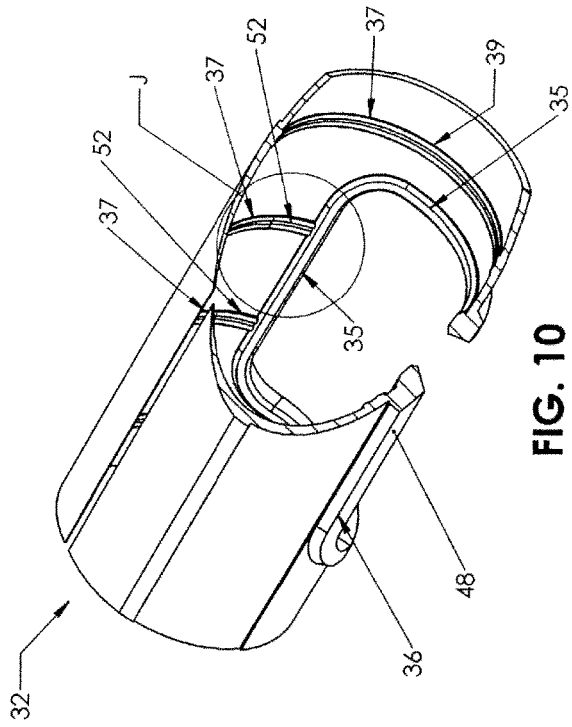
FIG. 10 is a partial cutaway isometric view of the upper gasket shown in FIG. 2.
Figure 11:
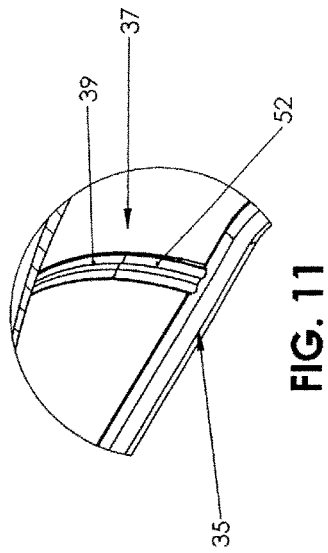
FIG. 11 is an enlarged detailed view of the upper gasket shown in FIG. 10, taken within the indicated circle J of FIG. 10.
Figure 8:
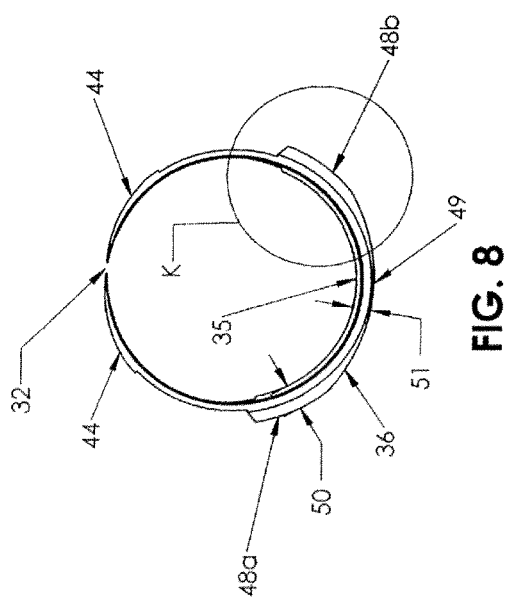
FIG. 8 is a front view of the upper gasket shown in FIG. 3.
Figure 9:
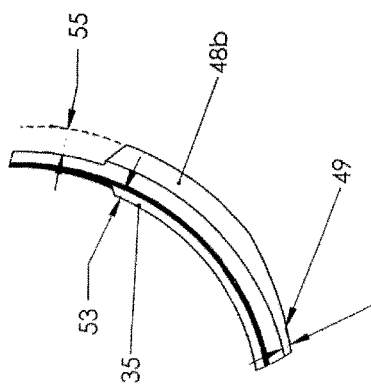
FIG. 9 is an enlarged detailed view of the upper gasket shown in FIG. 8, taken within the indicated circle K of FIG. 8.
Figure 12:
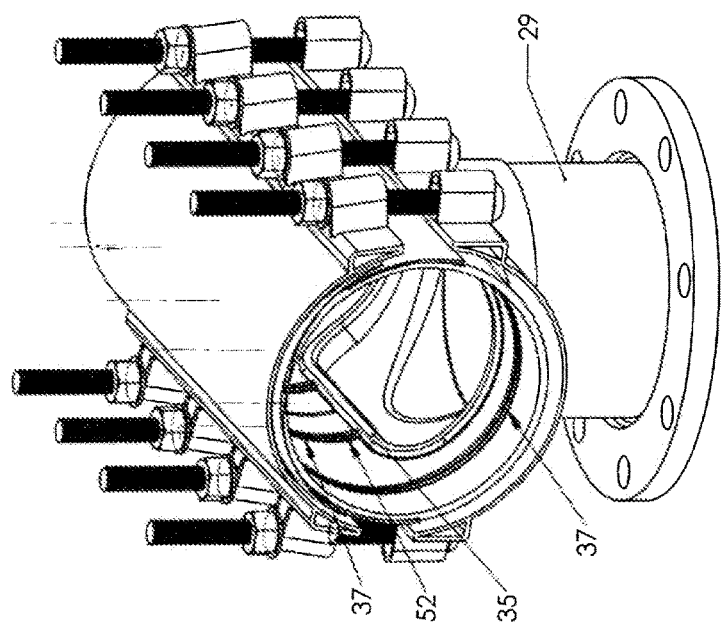
FIG. 12 is a left internal isometric view of the tapping sleeve shown in FIG. 2.

As shown in FIGS. 10 and 11, certain of circumferential seal beads 37 on the inside (pipe 16 side) of upper matte gasket 32 include a tapered portion 52 to an increased thickness where they approach and meet the longitudinally extending portion of inner aperture seal bead 35. Inner aperture seal bead 35 is generally thicker than the main portion 39 of circumferential seal beads 37. Tapered portion 52 thickens the end portions of beads 37 to about the same thickness as aperture seal bead 35. This thickened portion supports seal bead 35 and provides more uniform compression and better seal strength. Circumferential seal beads employing this ramped or inclined section 52 in the vicinity of the main aperture seal 22 substantially reduce a potential leak path that might otherwise occur due to rubber "foldover". Thus, it helps reduce the chances of a leak path forming that might otherwise occur with an abrupt thickness change at the junction between aperture seal bead 35 and circumferential seal bead 37.

Circumferential seal beads 37 utilize a double o-ring radial inwardly-facing geometry. Thus, the main matte gasket circumferential seal beads (both upper and lower gasket sheets) have parallel (double) seal beads of semicircular cross section, raised by pedestal above the main gasket sheet sealing surface, to provide for increased seal pressure and seal reliability.

As shown in FIGS. 3 and 5-8, branch aperture seal 22 has a varying, non-uniform thickness relative to axis x-x and, as shown in FIGS. 4 and 12-15, is substantially set back or separated from branch line 29 to upper shell 34 connection 54 by a varying and non-uniform distance 57.

Figure 13:
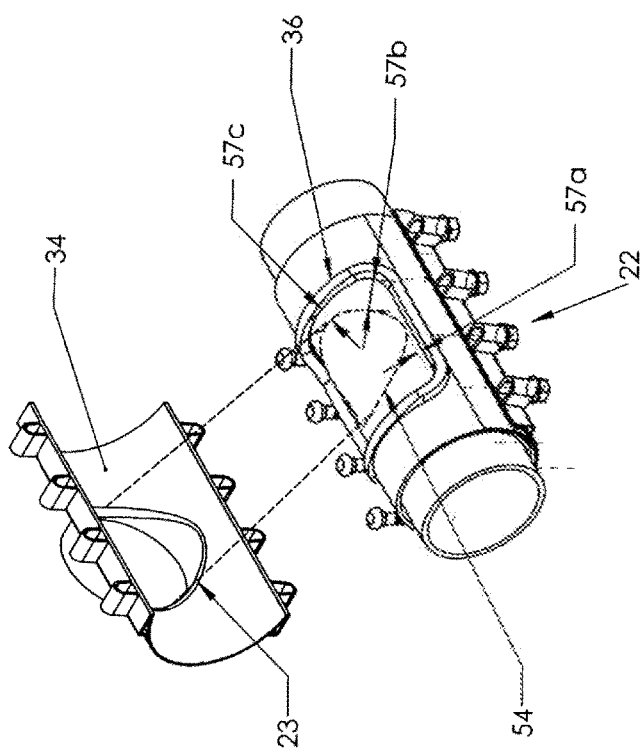
FIG. 13 is a partial exploded isometric view of the tapping sleeve shown in FIG. 1 without the branch line shown and including a projection of the branch aperture.
Figure 15:
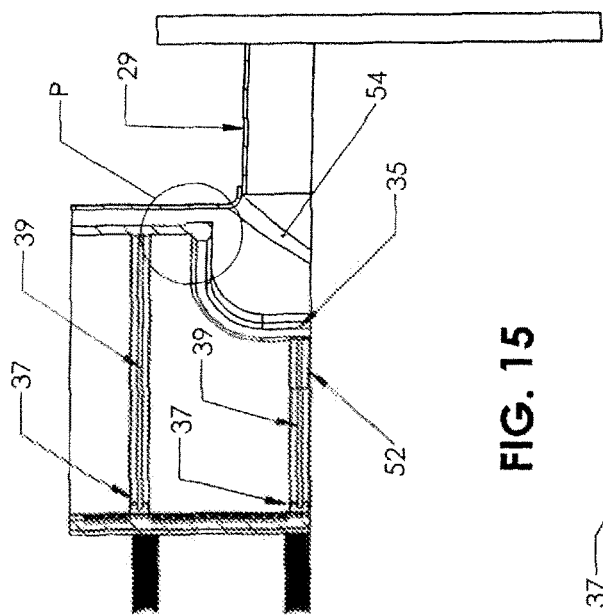
FIG. 15 is a horizontal cross-sectional view of the tapping sleeve assembly shown in FIG. 14, taken generally on line N-N of FIG. 14.
Figure 16:
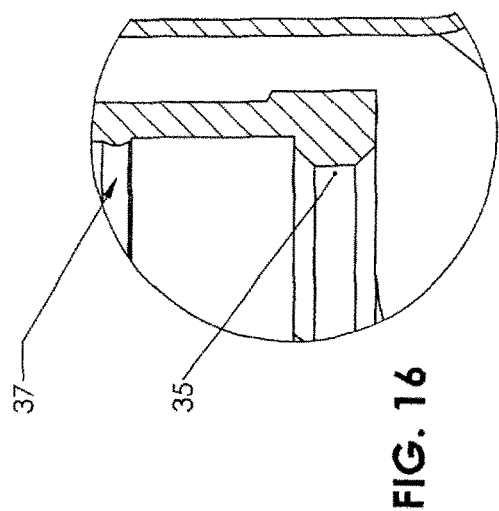
FIG. 16 is an enlarged detailed view of the tapping sleeve assembly shown in FIG. 15, taken within the indicated circle P of FIG. 15.
Figure 14:
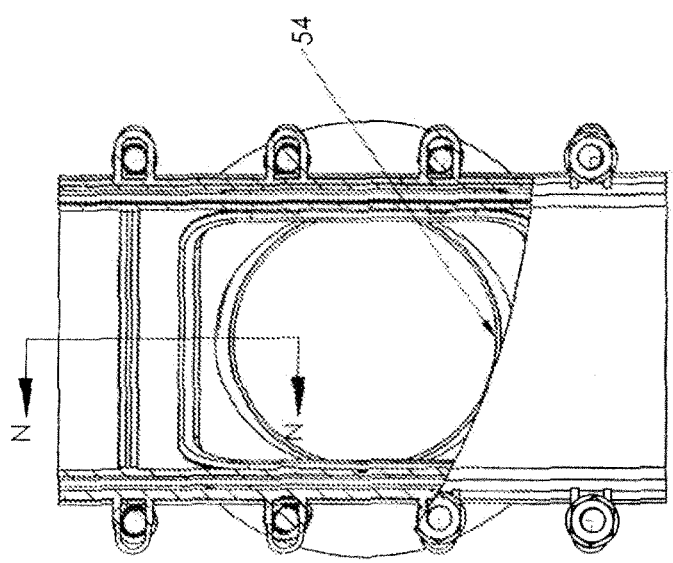
FIG. 14 is a partial horizontal cross-sectional view of the tapping sleeve assembly shown in FIG. 2.

FIG. 13 is an exploded view and shows the projection of shell aperture 23 on pipe 16 and set-off 57 relative to shell aperture 23. As shown, in this embodiment the varying, non-uniform set-off 57 from shell aperture 23 is achieved by providing a generally rectangular aperture seal 22 placed a distance 57 away from the generally circular aperture 23 in upper sleeve 34 and the upper sleeve 34 to branch 29 transition or connection 54. As an alternative, the contact path of seal 22 may be elliptical, polygonal or rhombic. The top shell 34 to branch 29 attachment connection 54 (typically a welded joint) tends to stiffen a region of upper shell 34, which limits deflection (radial flexure) in the vicinity of branch 29 as sleeve 15 is tightened to fluid carrying pipe 16. Set-off 57b moves the path of seal 22 outward of this stiffened region, resulting in an improved seal as sleeve 15 is tightened to fluid carrying pipe 16.

In this embodiment, minimum set-off distance 57a between the longitudinally extending portion of seal 22 and connection 54 is about $\frac{1}{16}$ of an inch. In this embodiment, the minimum set-off distance 57c between the transversely extending portion of seal 22 and connection 54 is about $\frac{1}{16}$ of an inch, and is typically about $\frac{1}{2}$ an inch and greater than set-off distance 57a. The radius 57b of the inside curvature of seal bead 22, where the transverse portion of aperture seal bead 22 meets the longitudinal portion, will typically be not greater than about 25% of the diameter of branch tube 29. Thus, for a 6.625 inch diameter branch tube 29, radius 57b is about 1.25 inches.

Thickened branch aperture sealing portion 22 of upper gasket 32 utilizes specially profiled radial sealing bead heights or thicknesses 50 and 51 between top shell 34 and pipe 16, which positions more gasket material against the fluid carrying pipe outer surface parallel to the longitudinal axis x-x of pipe 16. The aperture seal profile gradually reduces in thickness (reduced gasket material) in the direction perpendicular to longitudinal axis x-x of pipe 16. Branch aperture sealing portion 22 employs sealing beads both on the inside 35 (fluid carrying pipe 16 side) and on the outside 36 (tapping sleeve side) of upper matte gasket 32 and sheet 33. The additional branch aperture seal gasket thickness is distributed non-uniformly between the inside (fluid carrying pipe 16 side) and the outside (tapping sleeve side) of matte gasket 32. Gasket sealing force at the minimum fluid carrying pipe diameter is thereby achieved by uniform compression of the additional thickness of the branch aperture seal material. And gasket sealing force at the maximum fluid carrying pipe diameter is thereby achieved by additional compression of the entire gasket sealing beads with no significant loss of material integrity or gasket service life.

In particular, in this embodiment inner aperture seal bead 35 has a uniform radial thickness 53 or protrudes inwardly from sheet 33 a uniform distance. While in this embodiment inwardly facing gasket seal bead 35 is of uniform thickness 53 and projects at a uniform height above main gasket sheet 33, the total aperture seal bead thickness (inner seal bead 35 thickness, plus gasket sheet 33 thickness, plus outer seal bead 36 hyperbolic thickness) 50/51 may be distributed in such a manner that the inward facing aperture seal bead may be of non-uniform thickness or tip projection distance from main gasket sheet 33 in order to adjust for gasket compression. The thickness of main gasket sheet 33 may intersect the total aperture seal bead 22 thickness/height at any radial point along the total aperture seal bead 22 thickness.

Figure 7:
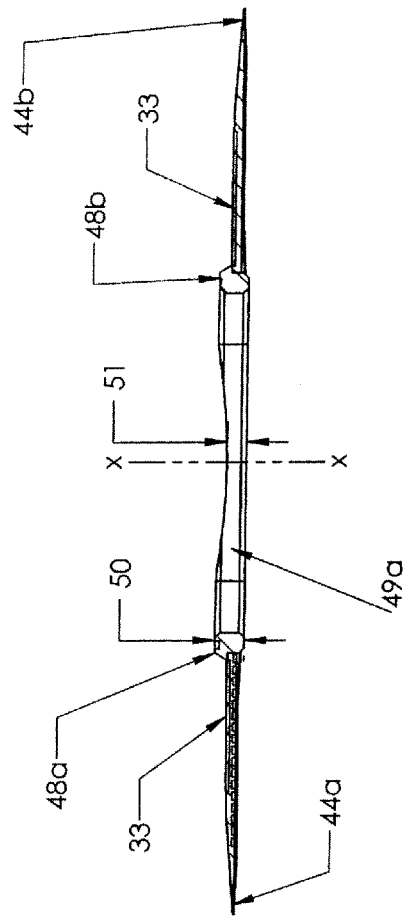
FIG. 7 is a transverse vertical cross-sectional view of the upper gasket shown in FIG. 5, taken generally on line C-C of FIG. 5.
Figure 6:
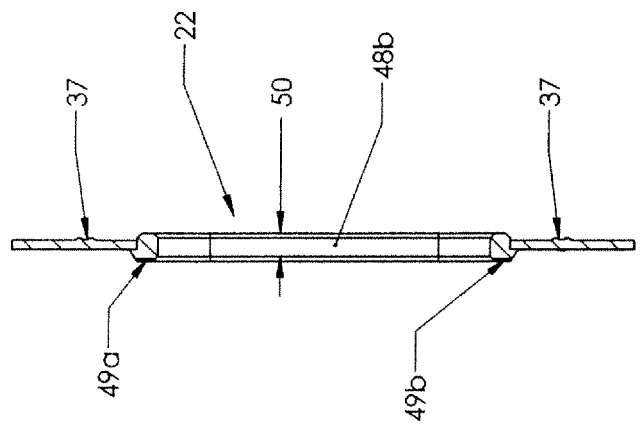
FIG. 6 is a longitudinal vertical cross-sectional view of the upper gasket shown in FIG. 5, taken generally on line B-B of FIG. 5.

In this embodiment outer aperture seal bead 36 is not of a uniform radial thickness or height and instead varies between a thicker 55 or more raised profile portion 48a and 48b along that portion of seal 22 that is parallel to longitudinal axis x-x of pipe 16 to a reduced or thinning 56 profile portion 49a and 49b in the transverse direction or perpendicular to longitudinal axis x-x of fluid carrying pipe 16. This results in positioning of more gasket material against the fluid carrying pipe outer surface parallel to the longitudinal axis of the fluid carrying pipe and reduced gasket material in the direction perpendicular to the longitudinal axis of the fluid carrying pipe. As shown in FIGS. 3 and 7, the thickness 56 of thinned portion 49a and 49b of seal bead 36 is proportional to its transverse distance from longitudinal axis x-x. In this embodiment the thinnest sections 51 of seal 22 are at its intersection with the x-y plane, and from these points the thickness of portions 49a and 49b increase gradually, in this embodiment non-linearly, with the increase in transverse distance from longitudinal axis x-x, until reaching a maximum total thickness 50. Alternative curves or tapers may be employed.

Figure 19:
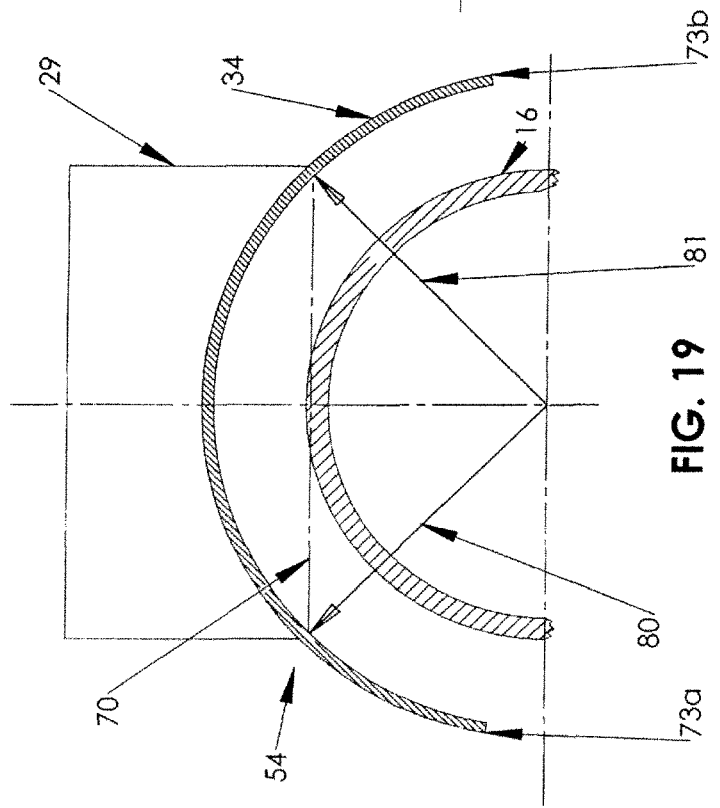
FIG. 19 is a partial schematic view of the upper shell, branch pipe and main pipe shown in FIG. 3 in a non-actuated condition.

FIG. 19 shows the general orientation and special geometry of upper shell 34, branch tube 29, and pipe 16 in a non-actuated condition, with gasket 32 omitted for clarity. Radials 80 and 81 in FIG. 19 indicate the extents of region 54, where branch tube 29 attaches to upper shell 34. Above line 70 of FIG. 19, branch tube 29 is attached to upper shell 34. Typically, attaching branch tube 29 to upper cylindrical half shell 34 stiffens the upper shell 34 sufficiently along the length of the shell to branch tube contact, the region above line 70, to prevent radial inward deflection of upper shell 34 when downward forces are applied to ends 73a and 73b of upper shell 34 when connector 21a and 21b is actuated or clamped and gasket 17 is compressed during product installation.

Figure 20:
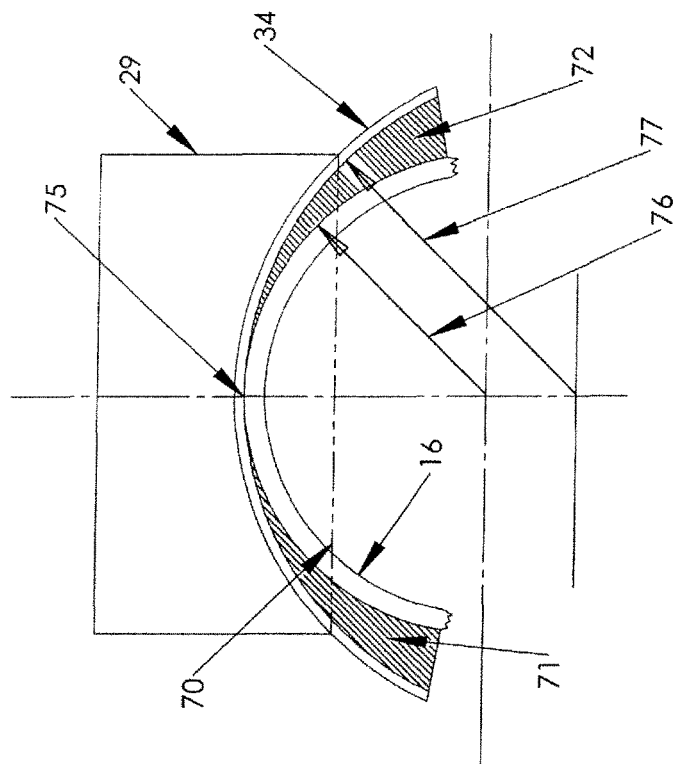
FIG. 20 is a partial schematic view of the minimum additional space filled by the upper gasket shown in FIG. 3.

FIG. 20 shows the generation of hyperbolic triangle regions 71 and 72, which represent in cross-section the minimum material that is added to seal bead 22 on the tapping sleeve shell side of main sheet gasket 33 in this embodiment. Thus, hyperbolic triangles 71 and 72 represent typical cross sections and thicknesses of the minimum additional outwardly extending material that is added to the sum of gasket sheet 33 and inwardly extending aperture seal bead 35 thicknesses to form an effective seal. The hyperbolic triangles are formed by arcs of different radii (pipe external radius 76 and shell internal radius 77) emanating from the same line 75, terminating at what is the outermost extents of the aperture seal in this cross sectional view.

The hyperbolic triangles depict the typical regions/areas/volumes that are to be filled with additional gasket material. However, the hyperbolic triangles do not define the extent or limit the extent, or shape, of the additional material thickness that may added to the gasket thickness, which may be more or less than the areas represented by hyperbolic triangles 71 and 72, in order to adjust gasket compression. The amount of additional gasket material that may be added to the aperture seal bead is not limited to the volume or area of the region depicted by hyperbolic triangles 71 and 72. The location and area/region/volume of the hyperbolic triangles depict the location of the typical voids that are filled with and occupied by the gasket material added to the sum of the gasket sheet thickness and the inner aperture seal bead thickness.

The range of pipe diameters on which conventional tapping sleeve designs can be sealed is limited by the top shell branch attachment connection 54 (typically a welded joint) which stiffens or "locks in" the tapping sleeve upper shell formed arc radius, and subsequently the tapping sleeve assembled diameter. This weld connection stiffens a region of the upper shell and prohibits further diametral deflection (radial flexure) in the vicinity of the branch, as the sleeve is tightened to the fluid carrying pipe. The limiting factor is the radius of the arc in the upper shell, which gets fixed at the junction of the upper shell and the branch tube. Typically the radius of that fixed arc in conventional products is about 0.100 to 0.300 inches greater than the radius of the branch pipe. In this embodiment, the radius of the arc in upper shell 34 at juncture 54 is typically about 0.6 to 0.7 inches greater than the radius of the smallest pipe 16 in the shell's range. For example, upper (branch side) shell 34 can be provided with an inside radius of 4.00 inches and be used on pipe 16 having a diameter range of between about 6.6 inches (3.3" r) and about 7.4 inches (3.7" r). For this configuration, gasket 32 maxes out at about a 0.7 inch thickness at the longitudinal run 48a and 48b of aperture seal 22.

As shown, sealing beads 35 and 36 are of a rounded rectangular shape and take advantage of the elastic deflection that occurs in the vicinity of the branch to upper shell connection 54 when sleeve assembly 14 is installed and bolt 18 tension is applied. While in this embodiment the cross sectional profiles of both internal and external aperture seal beads 35 and 36 are rectangular with chamfered corners at the tip edges, the inner and outer aperture seal bead cross sections may be rounded, square, rhombic, triangular, polygonal, multi-profiled, or any combination of same.

Near shell to branch transition 54, top shell 34 behaves as a rigid body. Between branch transition 54 and upper shell 34 sidebars 19a and 19b, elastic bending occurs when bolts 18 are tightened. Also, elastic behavior of top shell 34 occurs at a distance from the body to branch transition 54, providing gasket compression at main seal bead 22. This elastic bending is utilized to energize specially configured gasket main seal 22, which provides for gasket sealing on an increased range of fluid carrying pipe diameters for a given sleeve size. Thus, gasket seal 22 is thicker where shell 34 will flex to allow that flexure and the resulting conformance of sleeve 15 to the diameter of pipe 16. Gasket seal 22 is thinner where shell 34 is more rigid and flexure is less likely to occur. The additional outlet seal bead thickness (stand off height) is also divided between the tapping sleeve shell side and the fluid carrying pipe side of the main matte sheet of the upper gasket to eliminate the potential for gasket rollover.

As shown in FIGS. 1 and 2, spanners 30 and 31 are metallic strips that span the arc shaped gap between the longitudinally extending edges 73 and 74 of top half-shell 34 and lower half-shell 40 using the compression force exerted by the top and lower half-shell edges as sleeve 15 is tightened to fluid carrying pipe 16 to compress matte gaskets 32 and 42 to fluid carrying pipe 16. Current tapping sleeve gasket designs employ spanner strips that are embedded into the matte gasket, lie flush with the surface of the tapping sleeve side of the matte gasket, and do not project above the "outer" surface of the main gasket sheet. In this embodiment, as shown in FIGS. 3 and 18, spanners 30 and 31 are of an increased thickness 63, and project beyond recess 61 having a depth 62 in upper main gasket sheet 32 a distance 60. The longitudinally extending edges of spanners 30 and 31 are chamfered and/or planished 59 to allow for the outer shell to climb up (slide under) the spanner shell band during sleeve installation and tightening without interference or snagging. By using thicker spanner material, and allowing it to project above the tapping sleeve side of gasket 32 surface, gasket extrusion is minimized while allowing for maximum gasket thickness between the spanner inner surface and the fluid carrying pipe outer surface. This reduces the overall matte gasket thickness required thereby reducing manufacturing costs.

Figure 21:
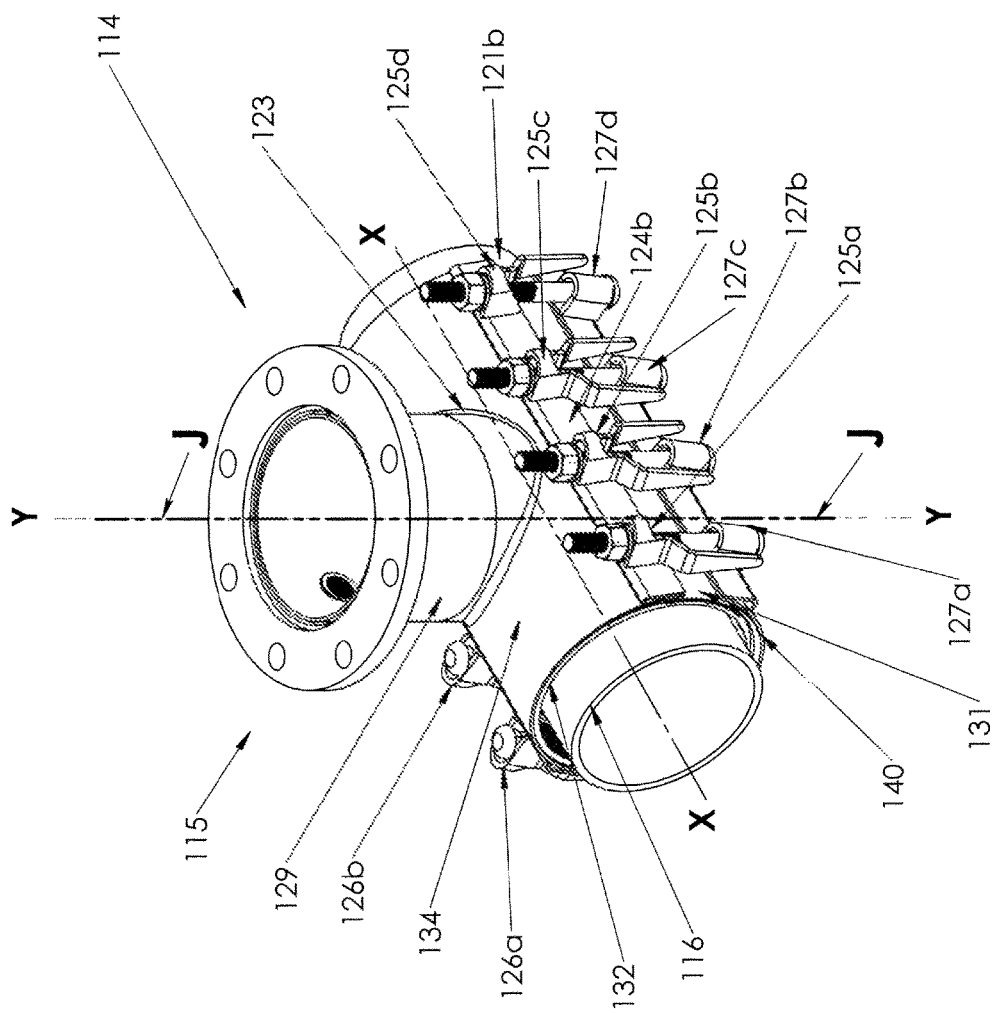
FIG. 21 is a top isometric view of a second embodiment of the improved tapping sleeve and gasket assembly in engagement with a pipe.
Figure 22:
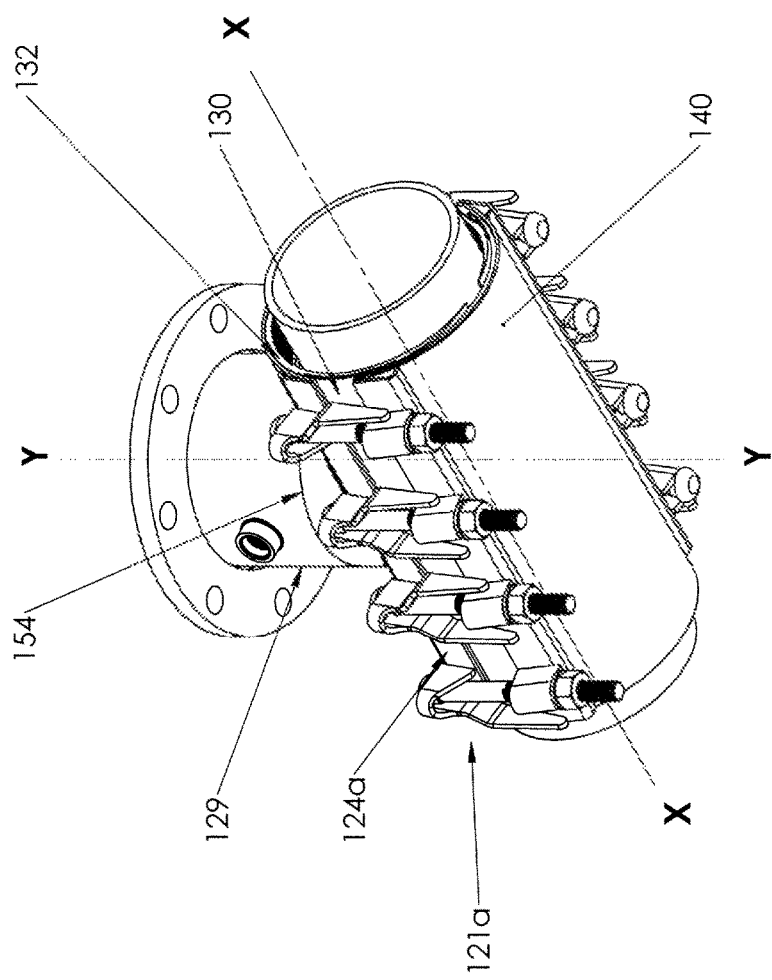
FIG. 22 is a bottom isometric view of the tapping sleeve assembly shown in FIG. 21.
Figure 23:
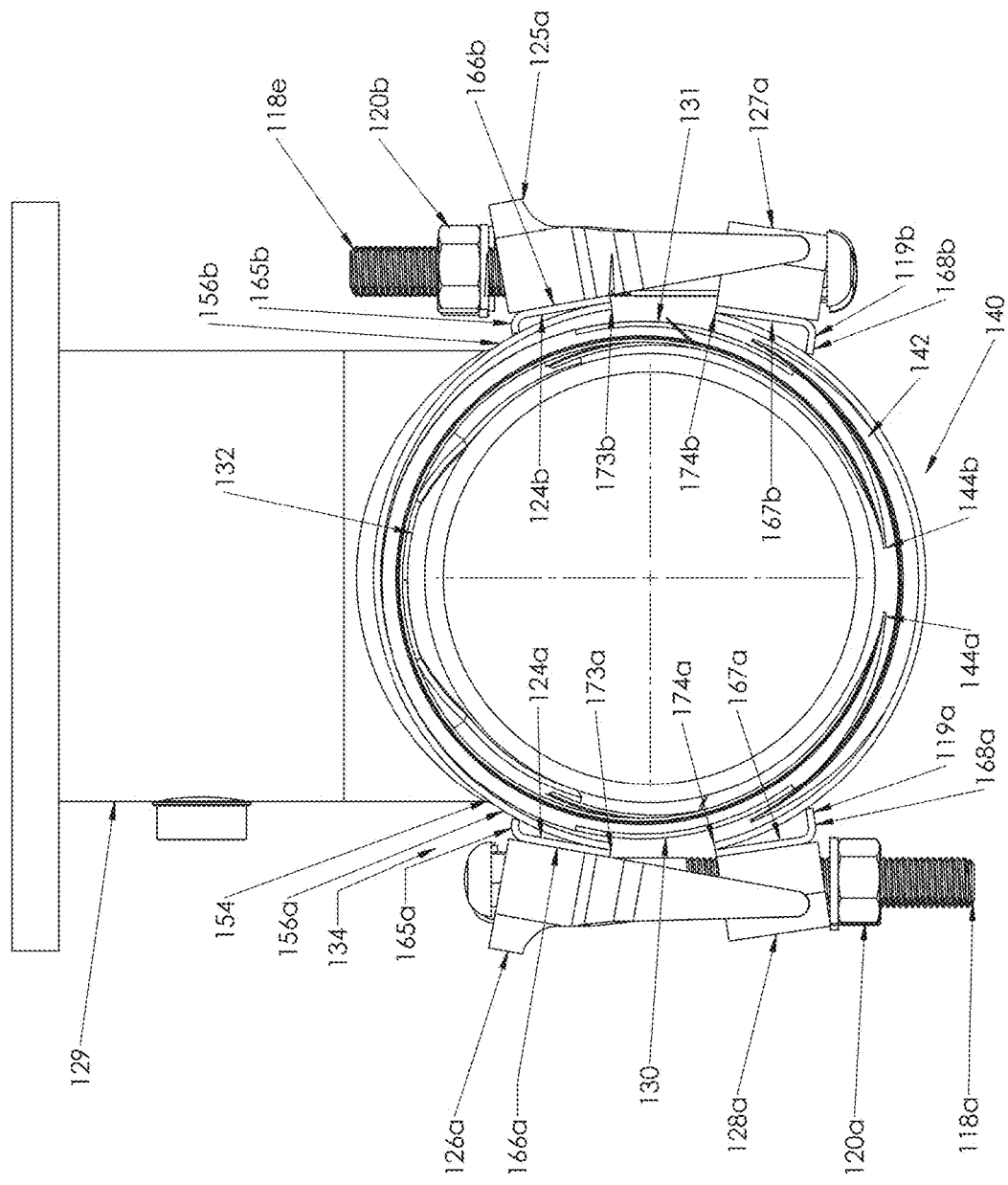
FIG. 23 is a left side view of the tapping sleeve assembly shown in FIG. 21.

A second embodiment of the improved tapping sleeve and gasket assembly is shown in FIGS. 21-51 and is generally indicated at 114. As shown in FIGS. 21-23, assembly 114 generally comprises tapping sleeve 115, which in operation is mounted on the outside of pipe 116, and upper gasket 132 and lower gasket 142, which in operation are disposed between pipe 116 and sleeve 115.

As in the first embodiment, tapping sleeve 115 includes semi-cylindrical top half shell 134, semi-cylindrical lower half shell 140, and specially configured spanners 130 and 131. Top half shell 134 and bottom half shell 140 are connected and tightened around pipe 116 with connection assembly 121. Tapping sleeve assembly 114 is formed by joining and welding in place a cylindrical branch connection 129 to top half shell 134, which is then mated to fluid carrying pipe 116 with upper gasket 132, lower half shell 140 and lower gasket 142. Gaskets 132 and 142 are sandwiched between the inside cylindrical surfaces of shells 134 and 140 and the outside cylindrical surface of main fluid carrying pipe 116 to provide sufficient sealing force to prevent leakage of fluid from the interface once a tap is made into fluid carrying pipe 116 through branch outlet 129. Elastic energy is imparted into the structure by tightening or actuating connections 121a and 121b from a loosened or non-actuated position, shown in FIGS. 21 and 22, to a tightened sealed position.

As shown in FIGS. 21-23 and 36-43, L-shaped sidebars 124a and 124b are welded to the two edges 173a and 173b of top shell 134 that are coincident with longitudinal axis x-x of pipe 116. Similarly, L-shaped sidebars 119a and 119b are welded to the two edges 174a and 174b of lower shell 140 that are coincident with longitudinal axis x-x of pipe 116. As shown, side bars 124a-b are formed of first generally horizontally extending members 165a-b, respectively, and second generally vertically extending members 166a-b, respectively, joined to each other at one longitudinal edge. Side bars 119a-b are formed of first generally horizontally extending members 168a-b, respectively, and second generally vertically extending members 167a-b, respectively, joined to each other at one longitudinal edge.

Horizontal members 165a-b are not as wide as vertical members 166a-b. Horizontal members 168a-b are not as wide as vertical members 167a-b. In addition, in this embodiment, side bars 124a and 124b are configured and positioned on upper shell 134 relative to branch aperture 123 branch to shell connection 154 such that the contact between the respective longitudinal edges of horizontal members 165a and 165b and upper shell 134 are spaced circumferentially a distance from branch/shell connection 154 so as to provide flexible regions 156a and 156b on shell 134 between branch/shell connection 154 and side bars 124a and 124b, respectively. This flexible region allows for shell 134 to bend or flex more uniformly into aperture seal 122, thereby increasing compression and the sealing forces when sleeve 115 is tightened to pipe 116. This geometry is provided even for size-on-size configurations, in which branch conduit 129 is about the same diameter as pipe 116.

As shown, a series of upper lugs 126a-d are welded to upper left side bar 124a, a series of lugs 125a-d are welded to upper right side bar 124b, a series of lugs 128a-d are welded to lower left side bar 119a, and a series of lugs 127a-d are welded to lower right side bar 119b. These lugs and side bars provide the necessary clearance outside of shells 134 and 140 for bolts 118a-h. Threaded bolts 118a-d extend between lugs 126a-d and 128a-d, respectively, and threaded bolts 118e-h extend between lugs 125a-d and lugs 127a-h, respectively. Corresponding nuts 120a-h are tightened on bolts 118 to draw sidebars 124a-b of top shell 134 and opposed sidebars 119a-b of lower shell 140 together, thereby tightening sleeve 115 to pipe 116. The top shell 134 to branch 129 attachment connection 154, conventionally a welded lap joint, tended to stiffen a region of upper shell 134, which limited deflection (radial flexure) in the vicinity of branch 129 as sleeve 115 was tightened to fluid carrying pipe 116. With specially-configured side-bars 119 and 124 and lugs 125-128, and by using a butt weld for connection 154, this stiffened region 155 is reduced and more flexible regions 156a and 156b are provided, resulting in an improved seal as sleeve 115 is tightened to fluid carrying pipe 116. Furthermore, with a size-on-size connection, cut-outs in side bars 124a and 124b are not needed around connection 154 to allow for side bars 124a and 124b to be connected to upper shell 134.

As shown, lugs 126 and 128 are specially configured to include moment reaction wings 196, 197 and U-shaped lug openings 192 and 193 in upper lugs 126 and 125, with such openings being recessed or cut-away so that outer depth 198 of the opening is less than depth 199 closer to the side bar. Wings 196 and 197 engage lower shell 140 and thereby prevent the shell edges from creasing spanners 130 and 131, respectively, and snagging the outer surface of the spanners. With horizontal members 168a-b not as wide as vertical members 167a-b, the wing and lug components have a more collinear alignment and keep the upper sidebar from lifting the upper shell off the gasket at high deflections, such as with smaller diameter pipes in the sleeve's nominal diameter range. The length of the shorter leg of sidebars 124 is provided to set the tangent angle of the sidebar and lugs to compensate for different arc lengths of motion for different tapping sleeve nominal diameter ranges.

Figures 40, 41:
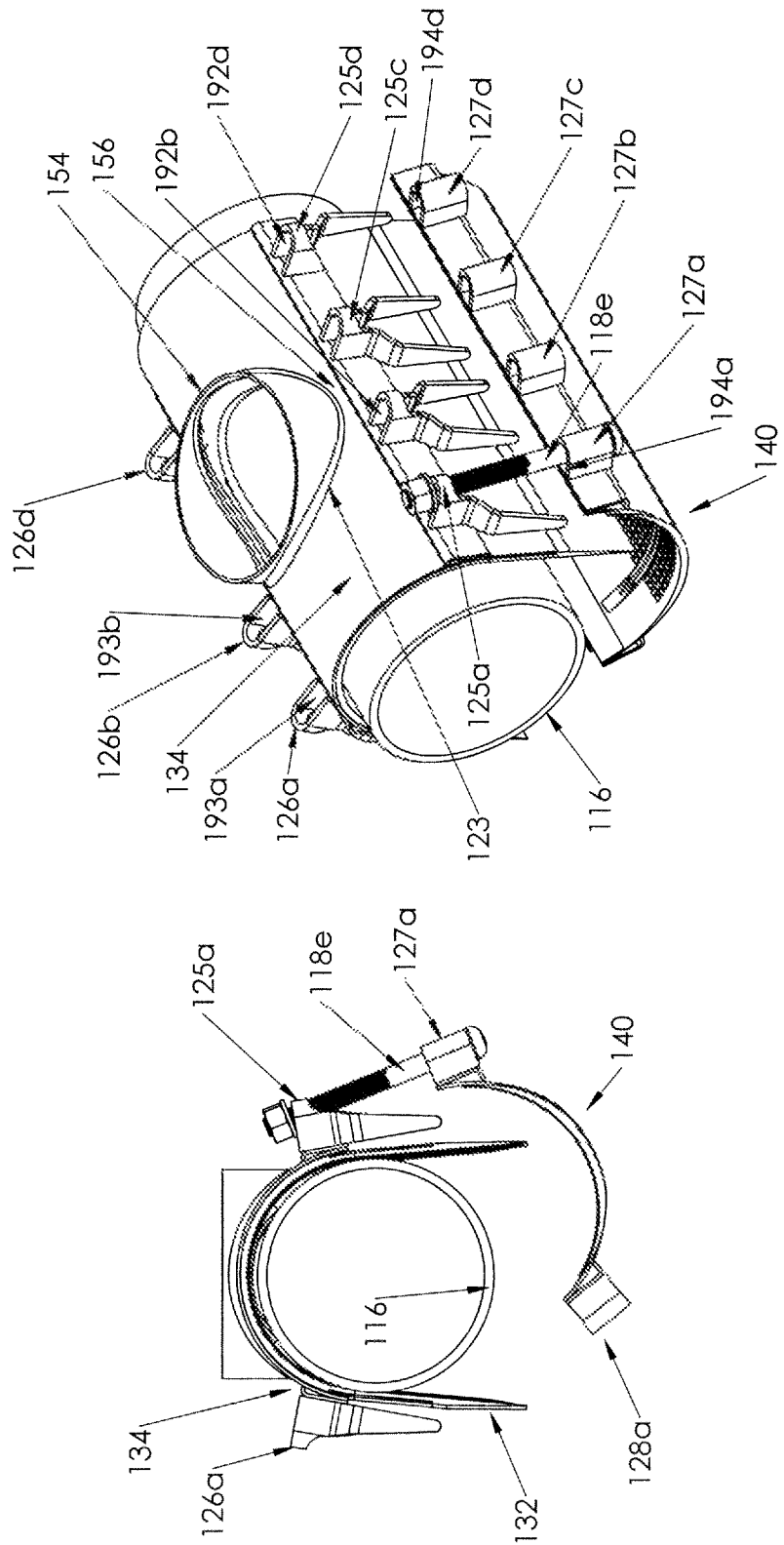
FIG. 40 is a side view of the tapping sleeve assembly shown in FIG. 21 in an open partially assembled position.
FIG. 41 is a right side isometric view of the tapping sleeve assembly shown in FIG. 40.
Figure 42:
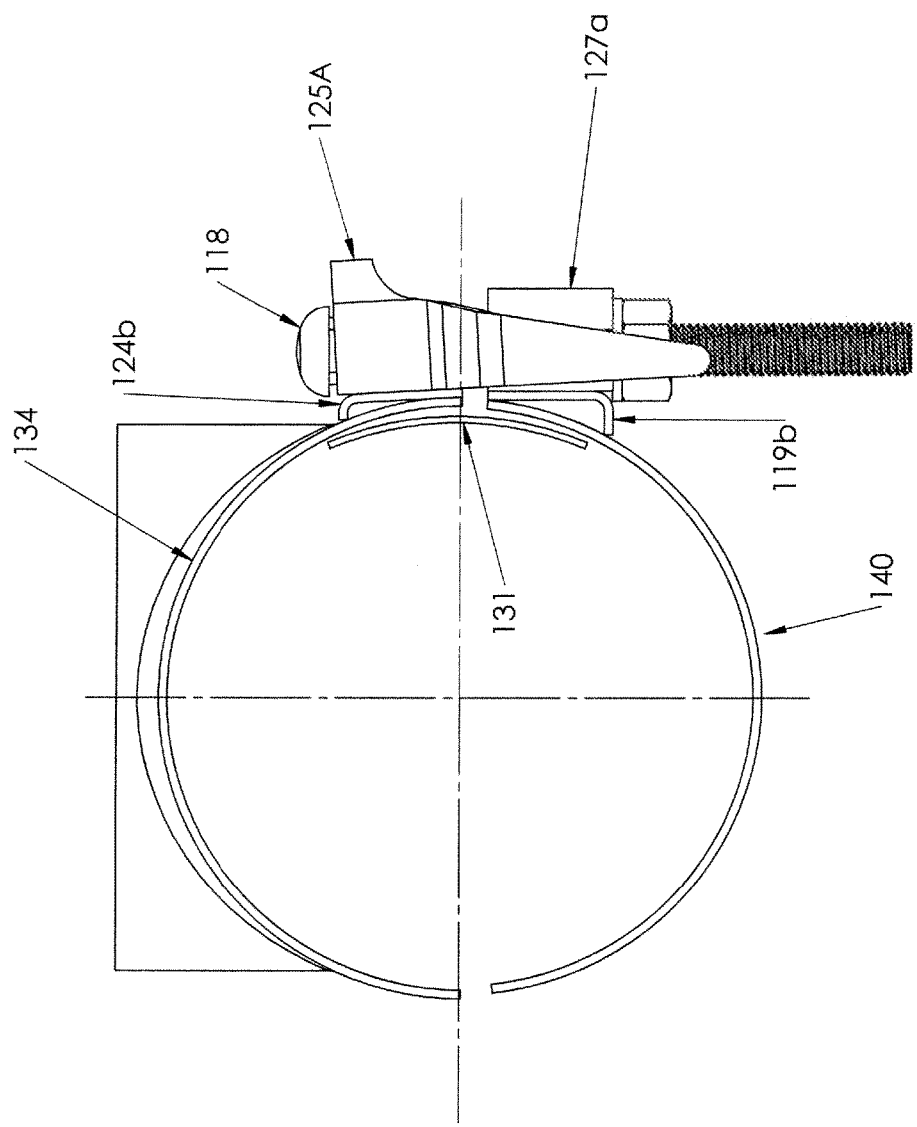
FIG. 42 is an end schematic geometry of the tapping sleeve assembly shown in FIG. 40 on a smaller sized diameter pipe within the nominal pipe diameter range of the tapping sleeve assembly.
Figure 43:
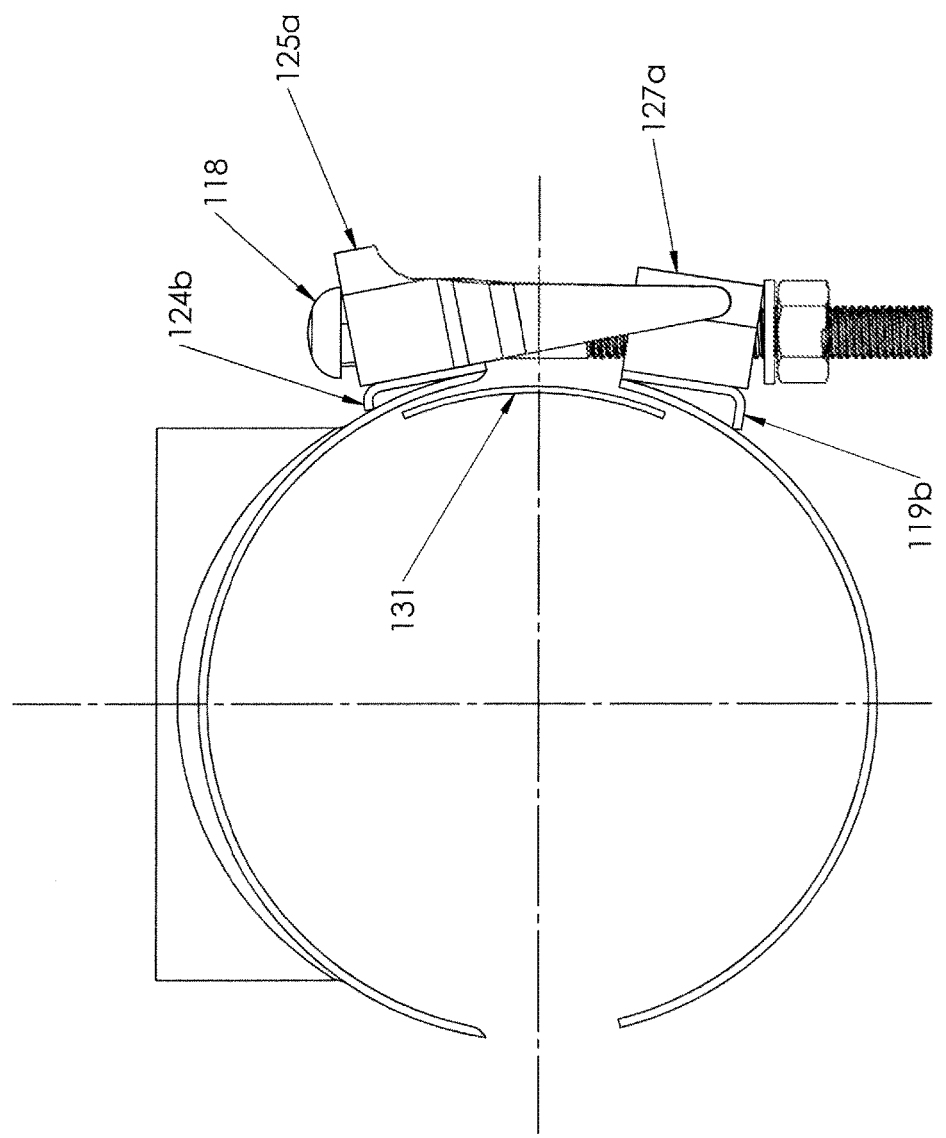
FIG. 43 is an end schematic geometry of the tapping sleeve assembly shown in FIG. 40 on a larger sized diameter pipe within the nominal pipe diameter range of the tapping sleeve assembly.

As shown in FIGS. 40-49, upper lugs 126a-d have U-shaped lug openings 193a-d, respectively, and upper lugs 125a-d have U-shaped lug-openings 192a-d, respectively. This is also another factor in increasing the range of sleeve 115. When used on a diameter pipe in the lower range, as shown in FIG. 42, bolt 118 is more in alignment with lugs 125 and 127. In a diameter pipe on the upper range, although bolts 118 are not as aligned with lugs 125 and 127, because of U-shaped openings 192 and 193, the bolt 118 passages between upper and lower shells 134 and 140 remain open and are not partially blocked by pipe 116. Also, the bolt heads of bolts 118 and nuts 120 on bolts 118 are permitted to migrate towards axis x-x in both the maximum and minimum diameters of the nominal tapping sleeve range, as shown in FIGS. 42-43.

In addition, lug openings 192 and 193 are recessed in depth near the bottom of the U, such that the outside depth 198 of the opening is less than the depth 199 closer to side bars 124. This allows bolts 118 to articulate in the respective lug opening, thereby permitting the hinging action shown in FIGS. 40-41, in which lower shell 140 is able to move in a hinged arc further away from pipe 116. Thus, lugs 125 and 126 are configured such that bolts 118 can pivot in lug openings 192 and 193 relative to sidebars 124, such that shell 134 may engage pipe 116 and shell 140 may be moved from a first position substantially disengaged from the main fluid conduit, as shown in FIGS. 40-41, to a second position engaging pipe 116, as shown in FIGS. 21-23.

As shown in FIGS. 40-49, lugs 125 and 126 include moment reactions wings 196 and/or 197. Lugs 125*b*, 125*c*, 126*b* and 126*c* are dual tined, having left wing 196 and right wing 197, as shown in FIGS. 44 and 45. Lugs 125*a* and 126*d* are single tined, having a single outside left tine 196, as shown in FIGS. 46 and 47. Lugs 125*d* and 126*a* are also single tined, having a single outside right tine 197, as shown in FIGS. 48 and 49. Lugs 125, 126, 127 and 128 are formed so that they are loaded in shear when shells 134 and 140 are tightened to pipe 116.

While side bars 124*b* and lugs 125*a-d*, for example, may be welded together, as an alternative they can be formed as a complete casting. In yet another alternative, four portions of side bar 124*b* and lugs 125*a-d* may be cast and then the four pieces welded at side bar joints to form the assembly part.

Connections 121*a* and 121*b* result in less stiffening of the longitudinal ends of shells 134 and 140 and thereby allow sleeve 115 to flex and actuate gasket 132 to form a tight seal when connections 121*a* and 121*b* are tightened.

Upper gasket 132 and lower gasket 142 are flexible elastomeric matte gasket sheets having specially contoured raised or thickened sealing beads, including circumferential seal beads 137*a-d* and thickened branch aperture seal 122 on upper gasket 132. As shown in FIGS. 23-29 and 32-36, and as in the first embodiment, upper gasket 132 is sized to encircle substantially completely the outside diameter of the smallest diameter fluid carrying pipe 116 for the given sleeve size. Lower matte gasket 142 is sized to span the zone of reduced gasket thickness and any gap between the longitudinal tapered proximal edge portions 144*a* and 144*b* of upper gasket 132. Thus, as the pipe diameter on which assembly 114 is installed increases, upper matte gasket 132 ends 144*a* and 144*b* separate, and lower matte gasket 142 further engages upper gasket 132 to continue the sealing action.

As explained in further detail below with respect to upper gasket 132, lower gasket 142 includes inwardly extending raised seal beads that running circumferentially and transversely to the longitudinal axis x-x of pipe 116. The inner seal beads face the outer surface of fluid carrying pipe 116 to provide for increased localized gasket sealing pressure.

As shown in FIGS. 23-39, upper gasket 132 is formed of a flexible sheet 133 with a specially contoured thickened aperture seal 122 and multiple transversely extending protruding or raised inner circumferential seal beads 137*a-d*. Aperture seal 122 has a specially contoured profile. In this embodiment, aperture seal 122 consists of a protruding or raised inner aperture seal bead 135. While shown as being integrally molded as part of gasket 132, main aperture seal 135 could be molded separately from the remainder of gasket 132, thereby allowing for different main seal profiles to be used interchangeably, which provide manufacturing costs reductions and improved inventory efficiency.

As shown, the inner surface 145 of sheet 133 of upper gasket 132 includes four inwardly extending raised seal beads 137*a-d* that running circumferentially and transversely to longitudinal axis x-x of fluid carrying pipe 116. Inner seal beads 137*a-d* face the outer surface of fluid carrying pipe 116 to provide for increased localized gasket sealing pressure. These circumferential seal beads provide for improved seal performance if main fluid carrying pipe 116 should suffer a complete circumferential break, as is possible when tapping sleeve 115 is used to branch into brittle conductor pipe materials such as ductile iron, asbestos cement or concrete pipe materials. Inner seal beads 137*a* and 137*b* are particularly important in controlling breaks from the outer transverse portions of the cut aperture. These circumferential raised seal beads provide matte gasket stiffening support, and prevent the matte gasket from undergoing extrusion at the shell free ends.

As shown in FIGS. 25-29, 34 and 35, each of circumferential seal beads 137*a* and 137*b* on the inside (pipe 116 side) of upper matte gasket 132 include tapered portion 153 to an increased thickness where they approach and meet a portion of inner aperture seal bead 135. Inner aperture seal bead 135 is generally thicker at this point than the main portion 139 of circumferential seal beads 137*a* and 137*b*. Tapered portion 153 thickens the end portions of beads 137*a* and 137*b* closer to the thickness of the subject portions of aperture seal bead 135. This thickened portion supports seal bead 135 and provides more uniform compression and better seal strength. In this embodiment the point of intersection between aperture seal bead 135 and circumferential seal bead 137, the height or thickness of circumferential bead 137 is still less than the height or thickness of aperture bead 135 so as to provide a volume for aperture seal 135 to compress into before circumferential bead 137 and aperture bead 135 material mate and occlude the opening. Circumferential seal beads employing this ramped or inclined section 153 in the vicinity of the main aperture seal 122 substantially reduce a potential leak path that might otherwise occur due to rubber "fold-over". Thus, it helps reduce the chances of a leak path forming that might otherwise occur with an abrupt thickness change at the junction between aperture seal bead 135 and circumferential seal beads 137*a* and 137*b*.

Figure 31:
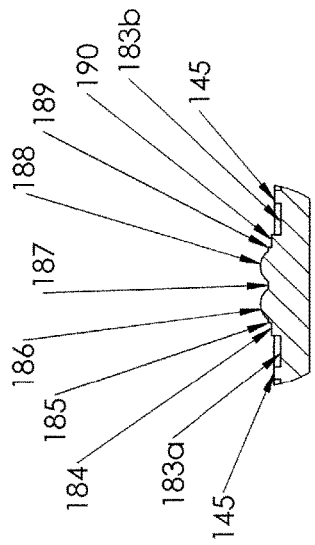
FIG. 31 is an enlarged detailed view of the upper gasket shown in FIG. 30, taken within the indicated circle P of FIG. 30.
Figure 30:
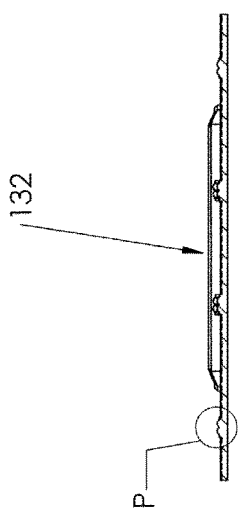
FIG. 30 is a longitudinal vertical cross-sectional view of the upper gasket shown in FIG. 25, taken generally on line O-O of FIG. 25.
Figure 29:
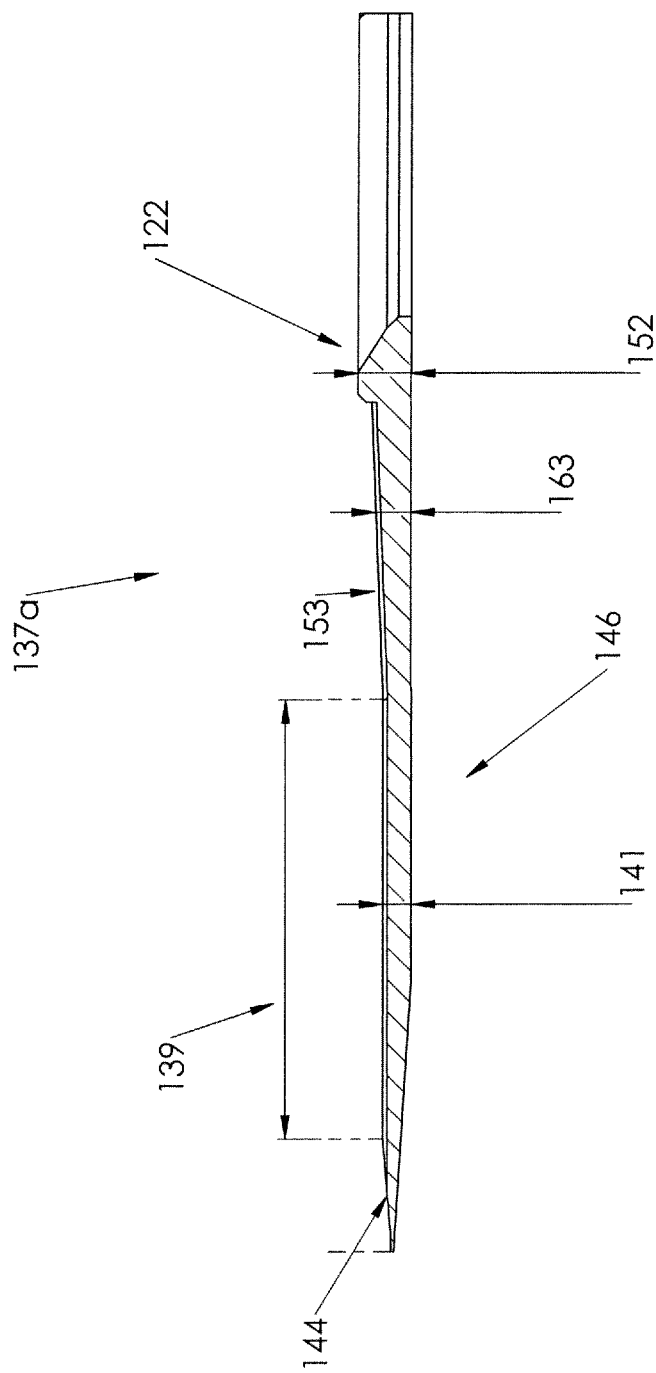
FIG. 29 is a partial transverse vertical cross-sectional view of the upper gasket shown in FIG. 25, taken generally on line N-N of FIG. 25.
Figure 34:
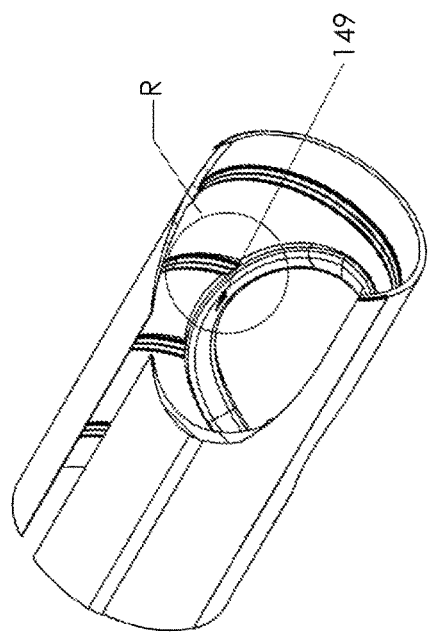
FIG. 34 is a partial cutaway bottom isometric view of the upper gasket shown in FIG. 21.
Figure 35:
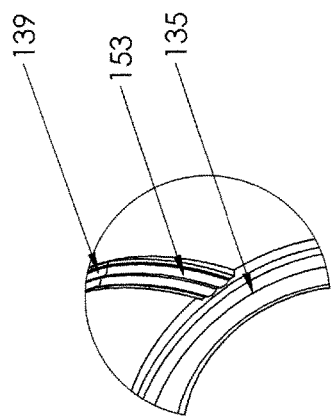
FIG. 35 is an enlarged detailed view of the upper gasket shown in FIG. 34, taken within the indicated circle R of FIG. 34.
Figure 32:
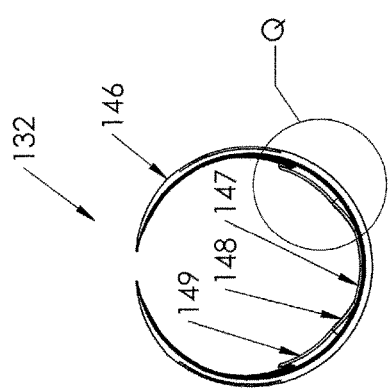
FIG. 32 is a front view of the upper gasket shown in FIG. 23.
Figure 33:
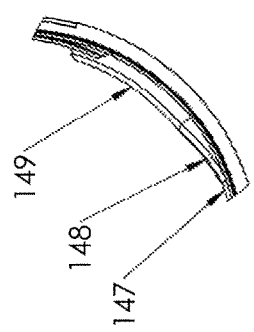
FIG. 33 is an enlarged detailed view of the upper gasket shown in FIG. 32, taken within the indicated circle Q of FIG. 32.

As shown in FIGS. 30 and 31, circumferential seal beads 137 utilize a pedestalled double o-ring radial inwardly-facing geometry or profile. Thus, main matte gasket circumferential seal beads 137, on both upper and lower gasket sheets 132 and 142, have parallel double seal beads of semicircular cross section, raised by pedestal above the main gasket sheet primary sealing surface 145, to provide for increased seal pressure and seal reliability. This profile provides additional gasket pack material to perform a complete 360 degree circumferential seal bead when connection assembly 121 is tightened and provides against a 360 degree or full break of pipe 116. The profile also assists in the progressive seal that occurs during installation and bolt tightening. As shown in FIG. 31, the profile of seal beads 137 are defined, moving left to right, by first level ledge or lower pedestal 184, which is raised above primary surface 145, second level ledge or upper pedestal 185, which is raised above lower pedestal 184, first semi-circular bead 186, which is supported by and extends above upper pedestal 185, land 187 between first bead 186 and second bead 188, second semi-circular bead 188, second level ledge or upper pedestal 189, which supports bead 188 and is raised above surface 145 to the same level as pedestal 185, and first level ledge or lower pedestal 190, which is raised above surface 145 to the same level as pedestal 184. As shown, surface 145 includes multiple waffle-type cavities 183 in the surface contouring. The sides of lower pedestals 184 and 190 are coincident with cavities 183*a* and 183*b*, respectively. This profile provides a zone to flow into when actuated by pressure as sleeve 115 is tightened to fluid carrying pipe 116. The described profile is particularly well adapted for peened surface ductile pipe or conduit.

Figure 25:
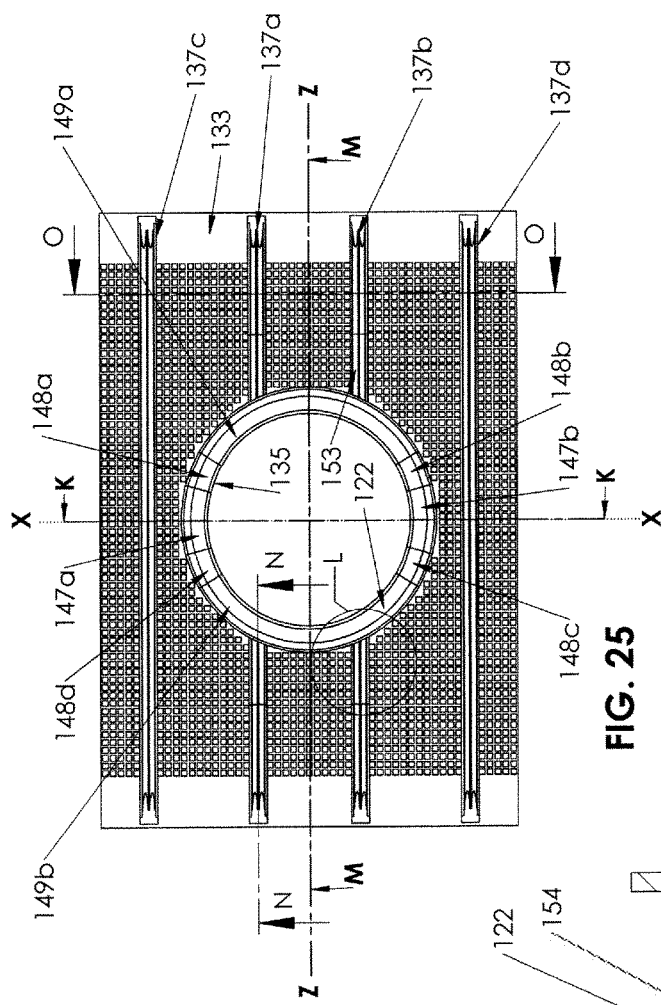
FIG. 25 is a top plan view of the upper gasket shown in FIG. 21 unrolled.
Figure 26:
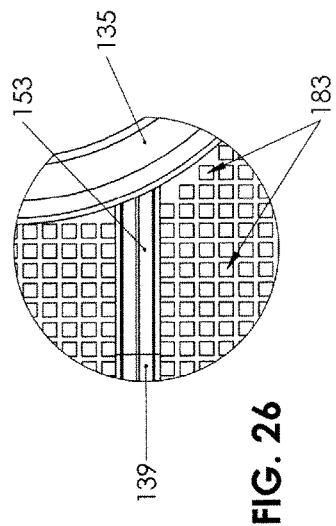
FIG. 26 is an enlarged detailed view of the upper gasket shown in FIG. 25, taken within the indicated circle L of FIG. 25.
Figure 24:
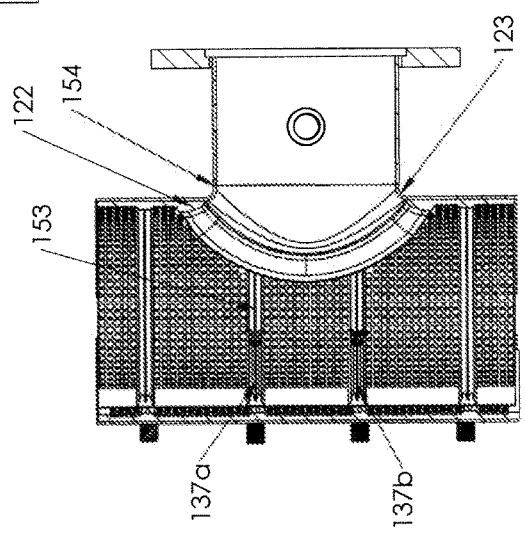
FIG. 24 is a longitudinal vertical cross-sectional view of the tapping sleeve assembly shown in FIG. 21, taken generally on line J-J of FIG. 21.

As shown in FIG. 25, in this embodiment aperture seal 122 is elliptical in shape, with minor axis x-x and major axis z-z. When in place, the minor axis of the ellipse is parallel to pipe 116 axis x-x. Also, as shown in FIGS. 23, 27-29 and 32-22, in this embodiment inner aperture seal bead 135 does not extend outwardly from master outer surface 146 of sheet or matte 133. Instead, bead 135 is thickened to inside surface 145 of matte 133.

Figure 39:
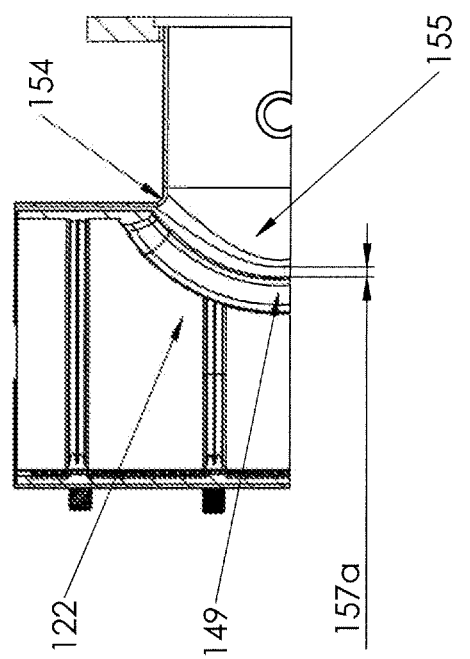
FIG. 39 is a horizontal cross-sectional view of the tapping sleeve assembly shown in FIG. 38, taken generally on line S-S of FIG. 38.
Figure 38:
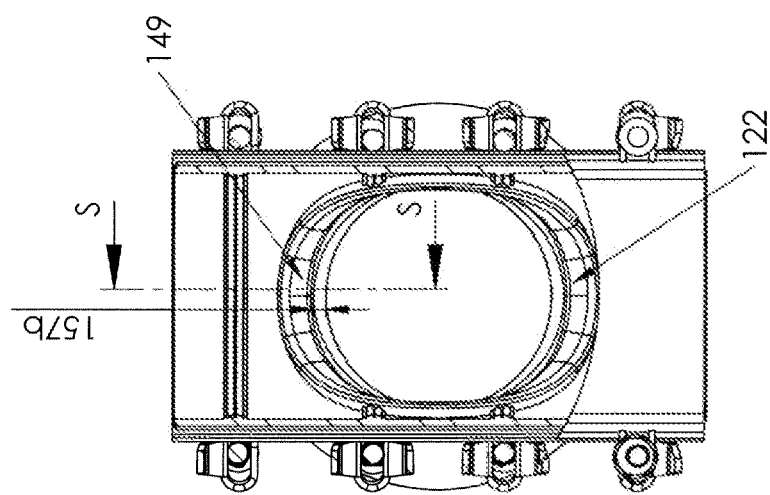
FIG. 38 is a partial horizontal cross-sectional view of the tapping sleeve assembly shown in FIG. 21.

Being elliptical in shape relative to circular branch aperture 123, as shown in FIGS. 38 and 39, aperture seal 122 is set back or separated from branch line 129 to upper shell 134 connection 154 by a varying and non-uniform distance 157a and 157b. As shown, in this embodiment the varying, non-uniform set-off 157 from connection 154 is achieved by providing a generally elliptical path of aperture seal 122 placed a distance 157 away from the generally circular aperture 123 and branch transition or connection 154. In this embodiment, minimum set-off distance 157a between the thickest portion 148 of seal 122 and connection 154 is about 1/16 of an inch. In this embodiment, the minimum set-off distance 157b between the thinnest portion 147 of seal 122 and connection 154 is about 3/8 of an inch, and is typically about 1/4 an inch and greater than set-off distance 157a.

As in the first embodiment, branch aperture 123 has a varying, non-uniform or graduated radial thickness relative to axis x-x. In this embodiment, thickened branch aperture sealing portion 122 utilizes specially profiled radial sealing bead heights or thicknesses 150-152 between top shell 134 and pipe 116. As shown in FIG. 25, inner aperture seal bead 135 is formed from, moving clockwise, first thinner portion 147a, first tapered and increasing in thickness intermediate portion 148a, first thicker portion 149a, second tapered and decreasing in thickness intermediate portion 148b, second thinner portion 147b, third tapered and increasing in thickness intermediate portion 148c, second thicker portion 149b, and fourth tapered and decreasing in thickness intermediate portion 148d, joined to first thinner portion 147a. Thus, the aperture seal profile gradually reduces or increases in thickness between thickest portions 149a and 149b, having a radial thickness 152, and thinnest portions 147a and 147b, having a radial thickness 150. Intermediate portions 148a-d provide a transitional varying sloped thickness 151 between thickest portions 149a and 149b and thinnest portions 147a and 147b, respectively.

Figure 28:
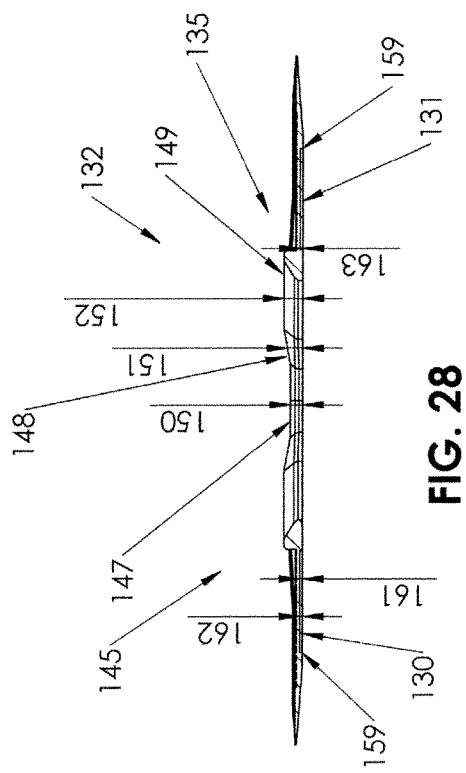
FIG. 28 is a transverse vertical cross-sectional view of the upper gasket shown in FIG. 25, taken generally on line M-M of FIG. 25.
Figure 27:
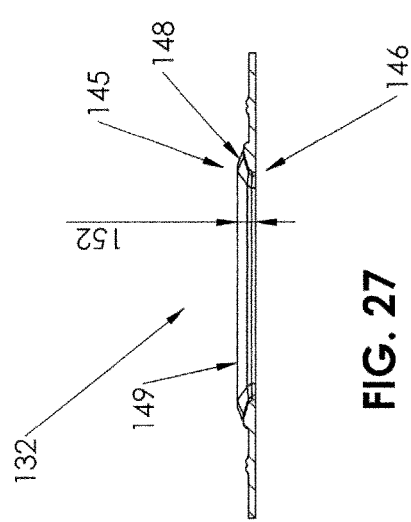
FIG. 27 is a longitudinal vertical cross-sectional view of the upper gasket shown in FIG. 25, taken generally on line K-K of FIG. 25.

This results in positioning of more gasket material against the fluid carrying pipe outer surface generally parallel to the longitudinal axis of the fluid carrying pipe and reduced gasket material in the direction perpendicular to the longitudinal axis of the fluid carrying pipe. As shown in FIGS. 27 and 28, thickness 151 of intermediate portions 148a-d of aperture seal 135 is proportional to its transverse distance from longitudinal axis x-x. In this embodiment, thinnest sections 147a and 147b of seal 135 are at its intersection with the x-y plane, and from each end of these portions 147a-b the thickness 151 of portions 148a-d increase gradually, in this embodiment linearly, with the increase in transverse distance from longitudinal axis x-x, until reaching a maximum total thickness 152 at portions 148a and 148b. Alternative curves or tapers, including non-linear transitions, may be employed.

Again, in this embodiment branch aperture sealing portion 122 employs a sealing bead only on the inside surface 145 (fluid carrying pipe 116 side) of upper matte gasket 132 and sheet 133. In this embodiment inner aperture seal bead 135 does not extend outwardly from sheet or matte 133. Gasket sealing force at the minimum fluid carrying pipe diameter is thereby achieved by uniform compression of the additional thickness of the branch aperture seal material. And gasket sealing force at the maximum fluid carrying pipe diameter is thereby achieved by additional compression of the entire gasket sealing beads with no significant loss of material integrity or gasket service life. The gasket undergoes progressive compression as assembly 121 is tightened to pipe 116 so that aperture seal 122 and seal beads 137 may translate and deform as needed before full sealing pressure is achieved.

Similar to the first embodiment, FIG. 52 shows the general orientation and special geometry of upper shell 134, branch tube 129, and pipe 116 in a non-actuated condition, with gasket 132 omitted for clarity. Radials 180 and 181 in FIG. 52 indicate the extents of region 154, where branch tube 129 attaches to upper shell 134. Above line 70 of FIG. 52, branch tube 129 is attached to upper shell 134. Typically, attaching branch tube 129 to upper cylindrical half shell 134 stiffens the upper shell 134 sufficiently along the length of the shell to branch tube contact, the region above line 70, to prevent radial inward deflection of upper shell 134 when downward forces are applied to ends 173a and 173b of upper shell 134 when connector 121 is actuated or clamped and gasket aperture seal 122 occupying this region is compressed during product installation.

FIG. 53 shows the generation of hyperbolic triangle regions 171 and 172, which represent in cross-section the minimum material that is added to seal bead 122 on the tapping sleeve conductor pipe 116 side of main sheet gasket 132 in this embodiment. Thus, hyperbolic triangles 171 and 172 represent typical cross sections and thicknesses of the minimum additional inwardly extending material that is added to gasket sheet 133 in inwardly extending aperture seal bead 135 thicknesses to form an effective seal. The hyperbolic triangles are formed by arcs of different radii (pipe external radius 76 and shell internal radius 77) emanating from the same line 75, terminating at what is the outermost extents of the aperture seal in this cross sectional view.

The range of pipe diameters on which conventional tapping sleeve designs can be sealed is limited by the top shell branch attachment connection 154, which stiffens or "locks in" the tapping sleeve upper shell formed arc radius, and subsequently the tapping sleeve assembled diameter. This weld connection stiffens a region of the upper shell and prohibits further diametral deflection (radial flexure) in the vicinity of the branch, as the sleeve is tightened to the fluid carrying pipe. One of the limiting factors is the radius of the arc in the upper shell, which gets fixed at the junction of the upper shell and the branch tube. Typically the radius of that fixed arc in conventional products is about 0.100 to 0.300 inches greater than the radius of the branch pipe. In this embodiment, the radius of arc 77 in upper shell 134 at juncture 154 is typically about 0.6 to 0.7 inches greater than the radius of the smallest pipe 116 in the shell's range. For example, upper (branch side) shell 134 can be provided with an inside radius of 4.00 inches and be used on pipe 116 having a diameter range of between about 6.6 inches (3.3" r) and about 7.4 inches (3.7" r). For this configuration, gasket 132 maxes out at about a 0.7 inch thickness 152 at the longitudinal run 149 of aperture seal 122.

Near shell to branch transition 154, top shell 134 behaves as a rigid body. In the region 156 between branch transition 154 and upper shell 134 sidebars 124a and 124b, elastic bending occurs when bolts 118 are tightened. Also, elastic behavior of top shell 134 occurs at a distance from the body to branch transition 154, providing gasket compression at main seal bead 122. This elastic bending is utilized to energize specially configured gasket main seal 122, which provides for gasket sealing on an increased range of fluid carrying pipe diameters for a given sleeve size. Thus, gasket seal 122 is thicker where shell 134 will flex to allow that flexure and the resulting conformance of sleeve 115 to the diameter of pipe 116. Gasket seal 122 is thinner where shell 134 is more rigid and flexure is less likely to occur. In this embodiment, the nominal diameter range of pipes on which a given sized tapping sleeve 114 may be employed is about 0.8 inches, which is about double conventional tapping sleeves.

As shown in FIGS. 50 and 51, and as in the first embodiment, spanners 130 and 131 are metallic strips that span the arc shaped gap between the longitudinally extending edges 173 and 174 of top half-shell 134 and lower half-shell 140 using the compression force exerted by the top and lower half-shell edges as sleeve 115 is tightened to fluid carrying pipe 116 to compress matte gaskets 132 and 142 to fluid carrying pipe 116. Current tapping sleeve gasket designs employ spanner strips that are embedded into the matte gasket, lie flush with the surface of the tapping sleeve side of the matte gasket, and do not project above the "outer" surface of the main gasket sheet. In this embodiment, as shown in FIGS. 50 and 51, spanners 130 and 131 may be of an increased thickness 163, and project beyond recess 161 having a depth 162 in upper main gasket sheet 132 a distance 160. The longitudinally extending edges 164 of spanners 130 and 131 may be chamfered and/or planished 159 to allow for the outer shell to climb up (slide under) the spanner shell band during sleeve installation and tightening without interference or snagging. By using thicker spanner material, and allowing it to project above the tapping sleeve side of gasket 132 surface, gasket extrusion is minimized while allowing for maximum gasket thickness between the spanner inner surface and the fluid carrying pipe outer surface. This reduces the overall matte gasket thickness required thereby reducing manufacturing costs.

The present invention contemplates that many changes and modifications may be made. Therefore, while forms of the improved tapping sleeve assembly has been shown and described, and a number of alternatives discussed, persons skilled in this art will readily appreciate that various additional changes and modifications may be made without departing from the spirit of the invention, as defined and differentiated by the following claims.

The invention claimed is:

1. A tapping sleeve assembly comprising:
a sleeve configured to clamp a main fluid conduit oriented about a longitudinal axis;
said sleeve having a first member, a second member separate from said first member, and a connecting assembly between said first member and said second member;
said first member having a branch aperture configured to communicate with a branch fluid conduit;
said connecting assembly configured and arranged to tighten said first and said second members to said main fluid conduit;
a gasket disposed between said first member and said main fluid conduit;
said gasket comprising a flexible sheet and a thickened aperture seal configured to extend around said branch aperture between said sleeve and said main fluid conduit;
said gasket comprising an inwardly protruding circumferential seal bead extending substantially transverse to said longitudinal axis and intersecting an inwardly protruding portion of said aperture seal;
said circumferential seal bead having a main length portion;
said inwardly protruding portion of said aperture seal having a radial thickness and said main length portion of said circumferential seal bead having a radial thickness less than said radial thickness of said inwardly protruding portion of said aperture seal;
said circumferential seal bead having a junction end portion between said main length portion of said circumferential seal bead and said inwardly protruding portion of said aperture seal; and
said junction end portion of said circumferential seal bead having along its length a non-uniform radial thickness.

2. The tapping sleeve assembly set forth in claim 1, wherein said junction end portion of said circumferential seal bead increases in radial thickness between said main length portion of said circumferential seal bead and said inwardly protruding portion of said aperture seal.

3. The tapping sleeve assembly set forth in claim 2, wherein said increase in radial thickness of said junction end portion is non-linear.

4. The tapping sleeve assembly set forth in claim 1, wherein said inwardly protruding portion of said aperture seal is arcuate.

5. The tapping sleeve assembly set forth in claim 1, wherein said aperture seal has a non-uniform radial thickness.

6. The tapping sleeve assembly set forth in claim 1, wherein said junction end portion of said circumferential seal bead has a thickness greater than said thickness of said main length portion.

7. The tapping sleeve assembly set forth in claim 6, wherein said junction end portion is tapered from substantially said thickness of said main length portion to substantially said thickness of said inwardly protruding portion of said aperture seal.

8. The tapping sleeve assembly set forth in claim 7, wherein said circumferential seal bead has a dual bead configuration.

9. The tapping sleeve assembly set forth in claim 1, wherein said gasket further comprises a second inwardly protruding circumferential seal bead extending substantially transverse to said longitudinal axis and intersecting a second inwardly protruding portion of said aperture seal.

10. The tapping sleeve assembly set forth in claim 9, wherein said inwardly protruding circumferential seal bead and said second inwardly protruding circumferential seal bead are substantially parallel.

11. The tapping sleeve assembly set forth in claim 10, wherein said inwardly protruding portion of said aperture seal and said second inwardly protruding portion of said aperture seal are connected and are of substantially the same radial thickness.

12. The tapping sleeve assembly set forth in claim 9, wherein said inwardly protruding circumferential seal bead and said second inwardly protruding circumferential seal bead are separated by a varying distance.

13. The tapping sleeve assembly set forth in claim 1, wherein said main length portion of said circumferential seal bead has a non-uniform radial thickness.

14. The tapping sleeve assembly set forth in claim 13, wherein said main length portion comprises a feathered end portion.

15. The tapping sleeve assembly set forth in claim 1, wherein said main length portion of said circumferential seal bead comprises a cross-sectional profile and said cross-sectional profile comprises a first lower ledge, a first bead, a second lower ledge and a second bead.

16. A tapping sleeve assembly comprising:
a sleeve configured to clamp a main fluid conduit oriented about a longitudinal axis;

said sleeve having a first member, a second member separate from said first member, and a connecting assembly between said first member and said second member;

said connection assembly configured and arranged to tighten said first and said second members to said main fluid conduit;

a gasket disposed between said first member and said main fluid conduit;

said gasket comprising a flexible sheet having a master contact surface and a seal bead having a cross-sectional profile protruding from said master contact surface;

said cross-sectional profile comprising:

a first lower ledge, a first bead, a second lower ledge and a second bead;

said first lower ledge between said master contact surface and said first bead and raised relative to said master contact surface;

said first bead raised relative to said first lower ledge;

said second bead between said first bead and said second lower ledge;

said second bead raised relative to said second lower ledge and said first lower ledge;

said second lower ledge between said master contact surface and said second bead and raised relative to said master contact surface;

a first upper ledge between said first lower ledge and said first bead;

a second upper ledge between said second lower ledge and said second bead;

said first upper ledge raised relative to said first lower ledge;

said second upper ledge raised relative to said second lower ledge;

said first bead raised relative to said first upper ledge; and said second bead raised relative to said second upper ledge.

17. The tapping sleeve assembly set forth in claim 16, wherein said cross-sectional profile further comprises a land between said first bead and said second bead.

18. The tapping sleeve assembly set forth in claim 16, wherein said flexible sheet comprises a waffle cavity between said master contact surface and said first lower ledge.

19. The tapping sleeve assembly set forth in claim 16, wherein said flexible sheet comprises a waffle cavity between said master contact surface and said second lower ledge.

20. The tapping sleeve assembly set forth in claim 16, and further comprising:

a second gasket disposed between said first member and said main fluid conduit;

said second gasket comprising a flexible sheet having a master contact surface and a seal bead having a cross-sectional profile substantially similar to said cross-sectional profile of said first gasket;

said seal bead of said first gasket and said seal bead of said second gasket aligned relative to said main fluid conduit so as to provide a 360 degree seal bead around said main fluid conduit.

* * * * *